United States Patent
Sumioka

(10) Patent No.: US 10,355,621 B2
(45) Date of Patent: Jul. 16, 2019

(54) CONTROL APPARATUS, CONTROL METHOD, AND DRIVING APPARATUS FOR VIBRATION-TYPE ACTUATOR, AND ELECTRONIC APPARATUS EQUIPPED WITH VIBRATION-TYPE ACTUATOR

(71) Applicant: CANON KABUSHIKI KAISHA, Tokyo (JP)

(72) Inventor: Jun Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/271,754

(22) Filed: Sep. 21, 2016

(65) Prior Publication Data
US 2017/0093304 A1 Mar. 30, 2017

(30) Foreign Application Priority Data
Sep. 30, 2015 (JP) ................. 2015-193427

(51) Int. Cl.
H02N 2/00 (2006.01)
(52) U.S. Cl.
CPC .................. *H02N 2/008* (2013.01)
(58) Field of Classification Search
CPC .................................... H02N 2/008
USPC ........................................ 318/116
See application file for complete search history.

(56) References Cited

U.S. PATENT DOCUMENTS

| | | | | |
|---|---|---|---|---|
| 6,608,426 B2* | 8/2003 | Hayashi | ................. | H02N 2/142 310/317 |
| 7,088,063 B2* | 8/2006 | Kurosawa | .............. | G11B 19/28 318/400.35 |
| 7,294,982 B2* | 11/2007 | Kurosawa | .............. | G11B 19/28 318/400.17 |
| 7,368,850 B2* | 5/2008 | Takeuchi | ............... | H02N 2/008 310/317 |
| 7,573,180 B2* | 8/2009 | Funakubo | ........... | H01L 41/0913 310/316.01 |
| 9,070,856 B1* | 6/2015 | Rose | ..................... | H01L 41/042 |
| 2005/0067986 A1* | 3/2005 | Kurosawa | .............. | G11B 19/28 318/400.35 |

(Continued)

FOREIGN PATENT DOCUMENTS

| | | |
|---|---|---|
| JP | 11-018453 A | 1/1999 |
| JP | 2012-235656 A | 11/2012 |

*Primary Examiner* — Bickey Dhakal
*Assistant Examiner* — Devon A Joseph
(74) *Attorney, Agent, or Firm* — Venable LLP

(57) ABSTRACT

A control apparatus is capable of improving responsiveness in a minute movement of a vibration-type actuator that has a vibration body (a piezoelectric device and an elastic body) and a driven body that pressure contacts with the vibration body. A driving unit moves the driven body by causing a thrust-up vibration in a pressurizing direction and a conveyance vibration in a perpendicular direction in the vibration body by applying alternating voltages to the piezoelectric device. A control unit feedback-controls a position of the driven body by using a first operational parameter that defines an amplitude ratio of the conveyance vibration to the thrust-up vibration and a second operational parameter that defines amplitudes of the conveyance vibration and the thrust-up vibration. A correction unit corrects a control amount of the first or second operational parameter so as to increase as the amplitude ratio decreases.

12 Claims, 19 Drawing Sheets

(56) References Cited

U.S. PATENT DOCUMENTS

| | | | |
|---|---|---|---|
| 2005/0116583 A1* | 6/2005 | Nishio | H02N 2/008 |
| | | | 310/317 |
| 2011/0298400 A1* | 12/2011 | Kudo | H02N 2/0015 |
| | | | 318/116 |
| 2012/0274243 A1 | 11/2012 | Sumioka | |
| 2012/0316675 A1* | 12/2012 | Urano | B25J 15/0009 |
| | | | 700/245 |
| 2014/0191691 A1* | 7/2014 | Kudo | H02N 2/0015 |
| | | | 318/116 |
| 2014/0292233 A1* | 10/2014 | Sumioka | H02N 2/008 |
| | | | 318/116 |
| 2014/0366672 A1* | 12/2014 | Urano | B25J 15/0009 |
| | | | 74/490.01 |
| 2016/0226402 A1* | 8/2016 | Morita | H02N 2/0075 |
| 2017/0019601 A1* | 1/2017 | Sumioka | G02B 7/09 |
| 2017/0126155 A1* | 5/2017 | Kurosawa | G11B 19/2054 |

* cited by examiner

FIRST VIBRATION MODE

SECOND VIBRATION MODE

CONTROL APPARATUS, CONTROL METHOD, AND DRIVING APPARATUS FOR VIBRATION-TYPE ACTUATOR, AND ELECTRONIC APPARATUS EQUIPPED WITH VIBRATION-TYPE ACTUATOR

BACKGROUND OF THE INVENTION

Field of the Invention

The present invention relates to a control apparatus, a control method, and a driving apparatus for a vibration-type actuator, and an electronic apparatus equipped with a vibration-type actuator.

Description of the Related Art

There is a known vibration-type actuator that makes a vibration body be in pressure contact with a driven body and moves the vibration body and driven body relatively by a vibration excited in the vibration body. When the relative movement of the vibration body and driven body is taken out as an output, a driving target is driven. The vibration body is configured by joining an electro-mechanical energy conversion element, such as a piezoelectric device, to an elastic body. The relative moving speed and moving amount of the vibration body and driven body are controllable by adjusting alternating voltage applied to the electro-mechanical energy conversion element.

When the vibration-type actuator is driven so as to move the driven body (or the vibration body) relatively by a minute distance (hereinafter referred to as a "minute movement"), it may take long time until reaching a target position due to a slow starting motion of the driven body (or the vibration body). Its specific example will be described with reference to FIG. 18A and FIG. 18B.

FIG. 18A is a view schematically showing an example of a driving profile in a case where a controller performs a position feedback control according to an instruction value that is a step signal to move the driven body (or the vibration body) by 2 micrometers. By comparing the instruction value indicated by a solid line with an actual position indicated by a broken line, it is understood that the starting motion takes time.

FIG. 18B is a view showing temporal changes of operation amount for driving the vibration-type actuator. The operation amount increases by integrating position deviations from the start of the instruction value. However, when the operation amount that defines a vibration excited in the vibration body is small, a normal feedback control gain degrades responsiveness. Accordingly, the driven body (or the vibration body) does not start moving until the operation amount reaches a certain amount.

A controller equipped with a gain change means that changes a feedback control gain on the basis of a detection value of relative movement speed of a vibration body and driven body is proposed to solve this problem (see Japanese Laid-Open Patent Publication (Kokai) No. H11-18453 (JP H11-18453A)). Moreover, a controller that controls alternating voltage applied to an electro-mechanical energy conversion element on the basis of a speed command in a low-speed-driving range is also proposed (see Japanese Laid-Open Patent Publication (Kokai) No. 2012-235656 (JP 2012-235656A)).

However, an operation parameter that defines amplitude and shape of a vibration (a shape and size of an elliptic movement) of the vibration body caused in friction sliding surfaces of the driven body and vibration body corresponding to instructed speed and actual speed of the driven body (or the vibration body) at the time of driving the vibration-type actuator has a nonlinear area. Accordingly, the above-mentioned conventional controllers for the vibration-type actuator cannot obtain sufficient responsiveness for the minute movement when only the feedback control gain or the voltage applied to the electro-mechanical energy conversion element is changed.

SUMMARY OF THE INVENTION

The present invention provides a control apparatus that is capable of improving responsiveness in a minute movement of a vibration-type actuator.

Accordingly, a first aspect of the present invention provides a control apparatus for a vibration-type actuator that has a vibration body, which is configured by connecting an electro-mechanical energy conversion element and an elastic body, and a driven body that is in pressure contact with the vibration body, the driving apparatus including a driving unit configured to relatively move the vibration body and the driven body by causing a thrust-up vibration in a pressurizing direction in which the vibration body is in pressure contact with the driven body and a conveyance vibration in a direction that is perpendicular to the pressurizing direction in the vibration body by applying a plurality of alternating voltages to the electro-mechanical energy conversion element, a control unit configured to feedback-control at least one of a relative position of the vibration body and the driven body and a driving speed by using a first operational parameter that defines an amplitude ratio of the conveyance vibration to the thrust-up vibration and a second operational parameter that defines amplitude of the conveyance vibration and amplitude of the thrust-up vibration, and a correction unit configured to correct at least one of a control amount of the first operational parameter and a control amount of the second operational parameter so as to increase as the amplitude ratio decreases.

Accordingly, a second aspect of the present invention provides a control method for a vibration-type actuator that has a vibration body, which is configured by connecting an electro-mechanical energy conversion element and an elastic body, and a driven body that is in pressure contact with the vibration body, the driving method including a driving step of relatively moving the vibration body and the driven body by causing a thrust-up vibration in a pressurizing direction in which the vibration body is in pressure contact with the driven body and a conveyance vibration in a direction that is perpendicular to the pressurizing direction in the vibration body by applying a plurality of alternating voltages to the electro-mechanical energy conversion element, a detecting step of detecting a relative position of the vibration body and the driven body, a control step of feedback-controlling at least one of the relative position of the vibration body and the driven body and a driving speed in the driving step by a first operational parameter that defines an amplitude ratio of the conveyance vibration to the thrust-up vibration, a second operational parameter that defines amplitude of the conveyance vibration and amplitude of the thrust-up vibration, and the relative position detected in the detecting step, and a correction step of correcting at least one of a control amount of the first operational parameter and a control amount of the second operational parameter so as to increase as the amplitude ratio decreases.

Accordingly, a third aspect of the present invention provides a driving apparatus including a vibration-type actuator that has a vibration body, which is configured by connecting an electro-mechanical energy conversion element and an elastic body, and a driven body that is in pressure contact with the vibration body, and the control apparatus of the first aspect.

Accordingly, a fourth aspect of the present invention provides an electronic apparatus including a member that is a target of positioning, a moving mechanism that movably supports the member, a vibration-type actuator that has a vibration body, which is configured by connecting an electro-mechanical energy conversion element and an elastic body, and a driven body that is in pressure contact with the vibration body, and the control apparatus of the first aspect.

According to the present invention, the responsiveness in a minute movement of the vibration-type actuator is improved.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1A:
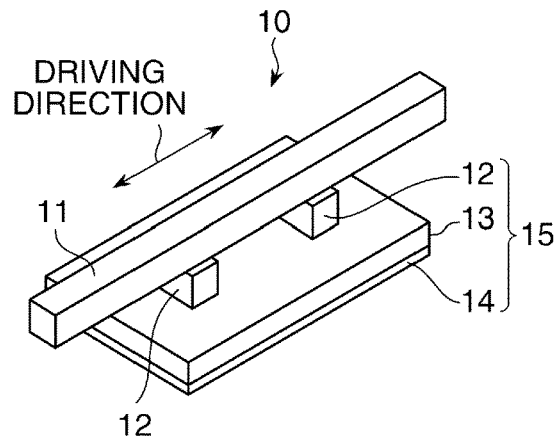
FIG. 1A is a perspective view schematically showing a configuration of a vibration-type actuator that is drivingly controlled by a control apparatus of the present invention.
Figure 1B:
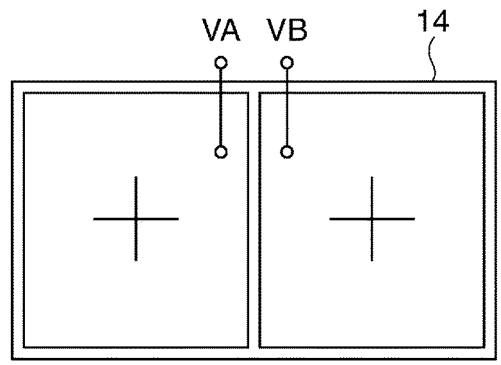
FIG. 1B is a plan view showing an electrode pattern and polarization regions formed on a piezoelectric device constituting the vibration-type actuator shown in FIG. 1A.
Figure 1C:
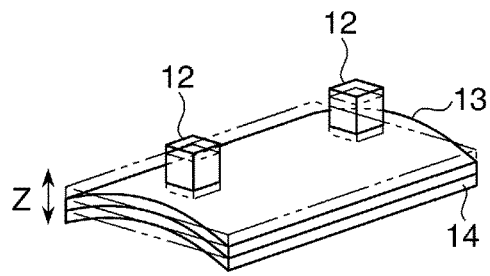
FIG. 1C is a perspective view schematically describing a vibration in a first vibration mode that is excited in a vibration body of the vibration-type actuator shown in FIG. 1A.
Figure 1D:
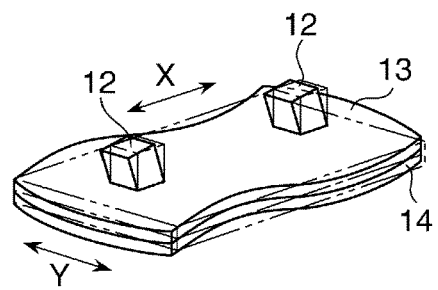
FIG. 1D is a perspective view schematically showing a vibration in a second vibration mode that is excited in the vibration body of the vibration-type actuator shown in FIG. 1A.

FIG. 1A is a perspective view schematically showing a configuration of a linearly-driving vibration-type actuator 10 that is an example of a vibration-type actuator as a target that is drivingly controlled by a control apparatus of the present invention. FIG. 1B is a plan view showing an electrode pattern and polarization regions formed on a piezoelectric device 14 constituting the vibration-type actuator 10. FIG. 1C is a perspective view schematically describing a vibration in a first vibration mode that is excited in a vibration body 15 constituting the vibration-type actuator 10. FIG. 1D is a perspective view schematically describing a vibration in a second vibration mode that is excited in the vibration body 15 of the vibration-type actuator 10.

The vibration-type actuator 10 has the vibration body 15 and a driven body 11. The vibration body 15 has an elastic body 13 and a piezoelectric device 14. For convenience of description, the vibration body 15 shall be fixed to a fixing means (not shown) and the driven body 11 shall be relatively moved against the vibration body 15 in this embodiment.

An elastic body 13 is a thin plate member made from stainless material, for example. Projections 12 are made from stainless material etc., and are formed integrally with the elastic body 13 on one side of the elastic body 13, or are joined by welding etc. The piezoelectric device 14, which is an electro-mechanical energy conversion element, is joined with adhesive etc. to the side opposite to the side on which the projections 12 are provided of the elastic body 13. The vibration body 15 is in pressure contact with the driven body 11 by a pressure means (not shown) at upper surfaces of the projections 12 in a pressurizing direction that is a projecting direction (a Z-direction shown in FIG. 1C) of the projections 12.

When alternating voltages of two phases is applied to the piezoelectric device 14, the vibration body 15 generates a vibration in the first vibration mode and a vibration in the second vibration mode. Accordingly, the driven body 11 that is in pressure contact with the projections 12 is moved in a direction connecting the two projections 12 (an X-direction that is a driving direction shown by an arrow).

The surface of the piezoelectric device 14 is equally divided into two electrode regions in the X-direction connecting the two projections 12. Polarization directions in the two electrode regions are identical (+). An alternating voltage VB is applied to the right-side electrode region in FIG. 1B among the two electrode regions of the piezoelectric device 14, and an alternating voltage VA is applied to the left-side electrode region.

When the alternating voltages VB and VA are applied in the same phase at a frequency near a resonance frequency in the first vibration mode, the piezoelectric device 14 expands in one moment and contracts in another moment as a whole. As a result, the vibration in the first vibration mode occurs in the vibration body 15. In the first vibration mode, two nodal lines, which are approximately parallel to the direction connecting the two projections 12 (X-direction), are generated. The projections 12 are disposed near the positions of antinodes of the vibration, and vibrate (displace) in the Z-direction that is the projecting direction of the projection 12. Hereinafter, the vibration in the first vibration mode is referred to as a "thrust-up vibration".

When the alternating voltages VB and VA are applied with the phase difference of 180 degrees at a frequency near a resonance frequency in the second vibration mode, the right electrode region of the piezoelectric device 14 contracts and the left electrode region expands in one moment, and the reverse relation appears in another moment. As a result, the vibration in the second vibration mode occurs in the vibration body 15. In the second vibration mode, three nodal lines, which are approximately parallel to a Y-direction that intersects perpendicularly to the X-direction and Z-direction, are generated. The projections 12 are disposed near the positions of nodes of the vibration, and are displaced in the X-direction. Hereinafter, the vibration in the second vibration mode is referred to as a "conveyance vibration".

Accordingly, when the alternating voltages of which the frequencies are respectively close to the resonance frequencies in the first and second vibration modes are applied to the electrodes of the piezoelectric device 14, the vibration that is generated by compositing the thrust-up vibration and conveyance vibration is excited. By compositing the thrust-up vibration and conveyance vibration, the projections 12 perform elliptic movements in the Z-X plane, and the driven body 11 moves relatively against the vibration body 15 in the X-direction by the elliptic movements. When the phase difference between the alternating voltages VB and VA are changed, the amplitude ratio of the thrust-up vibration and conveyance vibration is changed, which enables to adjust the driving speed of the driven body 11.

Figure 2:
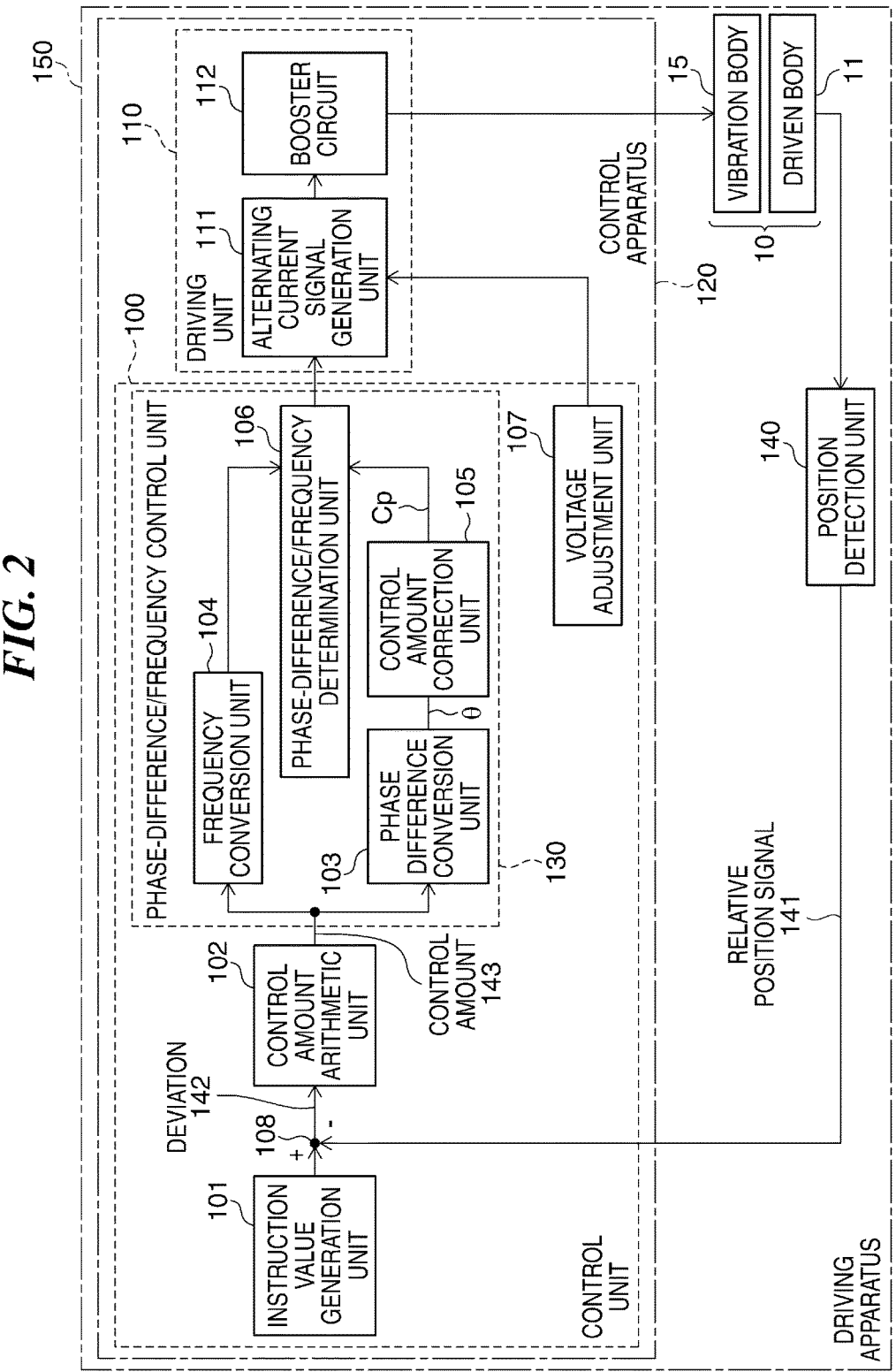
FIG. 2 is a block diagram schematically showing a configuration of a driving apparatus for the vibration-type actuator according to a first embodiment of the present invention.

Hereinafter, a first embodiment of the present invention will be described. FIG. 2 is a block diagram schematically showing a configuration of a driving apparatus 150 according to the first embodiment of the present invention. The driving apparatus 150 has the vibration-type actuator 10, a control apparatus 120, and a position detection unit 140. The control apparatus 120 has a control unit 100 and driving unit 110.

For convenience, the vibration-type actuator 10 shall be configured so that the vibration body 15 is fixed to a fixing means (not shown) and so that the driven body 11 is relatively moved against the vibration body 15, in the following description. Moreover, in this embodiment, driving of the vibration-type actuator 10 means changing the relative position of the driven body 11 and vibration body 15.

The position detection unit 140 detects the relative position of the vibration body 15 and driven body 11 on the basis of an output signal from a position sensor, such as a linear encoder disposed in the vibration-type actuator 10. A relative position signal 141 output from the position detection unit 140 is input into a subtractor 108 of the control unit 100. Accordingly, the relative position signal 141 is fed back to a control amount arithmetic unit 102, and the vibration-type actuator 10 is feedback-controlled so as to follow an instruction value about the relative position of the vibration body 15 and driven body 11 from an instruction value generation unit 101 at a predetermined interval. It should be noted that the relative position signal 141 may be found on the basis of a detection result of the driving speed of the driven body 11.

The control apparatus 120 that controls driving of the vibration-type actuator 10 is configured so as to enable to generate a signal including information used for controlling driving of the vibration body 15. The control unit 100 has the instruction value generation unit 101, the control amount arithmetic unit 102, the subtractor 108, a phase-difference/frequency control unit 130, and a voltage adjustment unit 107. The phase-difference/frequency control unit 130 has a phase difference conversion unit 103, frequency conversion unit 104, control amount correction unit 105, and phase-difference/frequency determination unit 106, and operates the amplitudes of the thrust-up vibration and conveyance vibration or the amplitude ratio thereof. The driving unit 110 has an alternating current signal generation unit 111 and booster circuit 112.

The instruction value generation unit 101 generates and outputs one instruction value at every control-sampling (every timing) of the relative position of the vibration body 15 and driven body 11, for example. The control-sampling means one cycle that starts from obtaining of a deviation 142 mentioned later, that includes application of the alternating voltage to the vibration body 15, detection of the driving speed of the driven body 11, and detection of the position of the driven body 11 against the vibration body 15, and that finishes just before the next obtaining of the deviation 142. Then, the relative position of the vibration body 15 and driven body 11 (or the driving speed of the driven body 11) is feedback-controlled within this one cycle.

The subtractor 108 calculates the difference between the relative position signal 141 of the vibration body 15 and driven body 11 that is detected by the position detection unit 140 and the instruction value as the deviation 142, and outputs the calculated deviation 142 to the control amount arithmetic unit 102. The control amount arithmetic unit 102 calculates a control amount 143 with using the deviation 142, and outputs the control amount 143 calculated to the phase difference conversion unit 103 and frequency conversion unit 104. It should be noted that the control amount arithmetic unit 102 calculates the control amount 143 using a PID compensator etc., for example. The PID compensator adds outputs from compensation units that have functions of proportionality (P), integration (I), and differentiation (D), respectively. The PID compensator compensates phase delay and gain of a control target and is generally used to construct a stable and highly accurate control system.

The phase difference conversion unit 103 and the frequency conversion unit 104 respectively convert the control amount 143 into a control amount of phase difference (a first operational parameter) and into a control amount of frequency (a second operational parameter) that are operation parameters for the alternating current signal for driving the vibration-type actuator 10. The phase difference conversion unit 103 outputs the generated phase difference control amount θ to the control amount correction unit 105. Moreover, the frequency conversion unit 104 outputs the generated frequency control amount to the phase-difference/frequency determination unit 106.

The control amount correction unit 105 finds a phase difference correction amount Cp on the basis of the phase difference control amount θ that is input from the phase difference conversion unit 103, and outputs the phase difference correction amount Cp to the phase-difference/frequency determination unit 106. It should be noted that a specific method to find the phase difference correction amount Cp will be mentioned later with reference to FIG. 4A and FIG. 4B.

The phase-difference/frequency determination unit 106 generates the frequency control amount and phase difference control amount for controlling the driving speed and driving direction of the driven body 11 on the basis of the frequency control amount and phase difference correction amount Cp that were input, and outputs them to the alternating current signal generation unit 111 of the driving unit 110. It should be noted that the output from the phase-difference/frequency determination unit 106 will be mentioned later with reference to FIG. 5A etc.

The alternating current signal generation unit 111 generates alternating current signals of two phases on the basis of the phase difference control amount and frequency control amount that were input from the phase-difference/frequency determination unit 106 and the pulse width information input from the voltage adjustment unit 107, and then outputs it to the booster circuit 112. The booster circuit 112 generates an alternating voltage (a driving signal) by raising the input alternating current signal to a desired voltage value, and applies the generated alternating voltage to the piezoelectric device 14 of the vibration body 15. Accordingly, the vibration body 15 and the driven body 11 move relatively. It should be noted that in this embodiment, the "alternating current signal" shall mean a signal before boosting by the booster circuit 112.

The control unit 100 mentioned above consists of digital devices, such as a CPU and PLD (ASIC is included), and elements, such as an A/D converter, for example. Moreover, the alternating current signal generation unit 111 of the driving unit 110 has a CPU, function generator, and switching circuit, for example. The booster circuit 112 consists of a coil and transformer, for example. Each of the control unit 100 and the driving unit 110 may not only consist of one element or one circuit, but may consist of a plurality of elements and circuits. Moreover, any elements and circuits may perform each process.

Figure 3A:
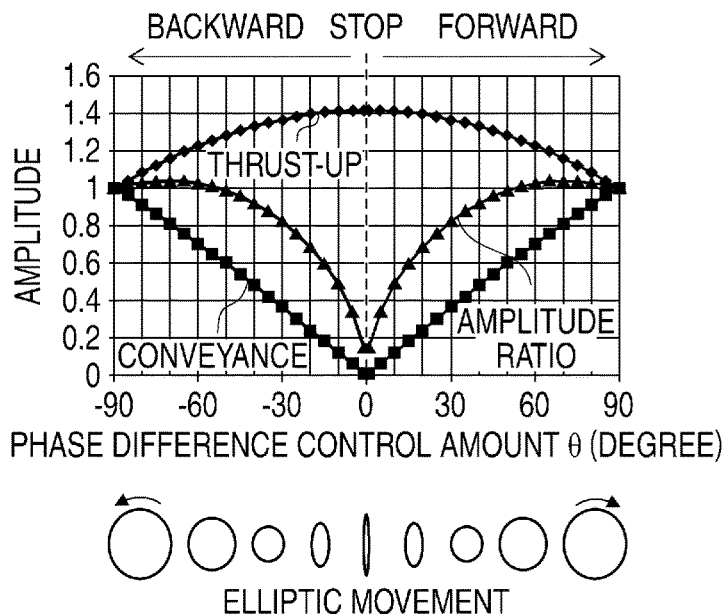
FIG. 3A is a graph showing a relation between amplitude of a thrust-up vibration, amplitude of a conveyance vibration, an amplitude ratio of the thrust-up vibration and conveyance vibration, and a phase difference control amount.

Next, various arithmetic processes by the control unit 100 will be described. FIG. 3A is a graph showing a relation between amplitude of the thrust-up vibration, amplitude of the conveyance vibration, an amplitude ratio of the thrust-up vibration and conveyance vibration, and the phase difference control amount θ. By changing the phase difference control amount θ, the elliptical ratio of the elliptic movement that occurs in the projections 12 varies. When the sign of the phase difference control amount θ is reversed, the direction of the elliptic movement varies. Moreover, when the elliptical ratio is equal to zero (the ellipse shows a lengthwise shape), the relative position of the driven body 11 and vibration body 15 does not vary, and they are in an approximately stopped state. Variations of the vibration amplitude Az of the thrust-up vibration and the vibration amplitude Ax of the conveyance vibration on the basis of the phase difference control amount θ are respectively calculated by the following formula 1 and formula 2.

According to the calculations, when the phase difference control amount θ is equal to ±90 degrees, the vibration amplitude Az is identical to the vibration amplitude Ax. When the phase difference control amount θ is equal to 0 degrees, only the thrust-up vibration occurs. Although the phase difference control amount θ is variable within a control range from −90 to +90 degrees, for example, a range from −60 to +60 degrees or a range from −20 to +120 degrees may be also employed.

The elliptical ratio of the elliptic movement that occurs in the projections 12 varies according to the amplitude ratio of the conveyance vibration to the thrust-up vibration. The amplitude ratio is calculated by the following formula 3, and shows a nonlinear characteristic as shown in FIG. 3A. It should be noted that a symbol "k" used in the following formula 3 is an admittance ratio of the conveyance vibration to the thrust-up vibration (a ratio of the admittance peaks shown in FIG. 3C), and corresponds to the sensitivity to change of a response speed. For example, when the admittance ratio becomes small, the sensitivity lowers, and the change of the open loop gain to the phase difference control amount θ becomes small.

$$\text{Amplitude of thrust-up vibration: } Az = \sqrt{2} \cos\left(\frac{\theta}{2}\right) \quad \text{Formula 1}$$

$$\text{Amplitude of conveyance vibration: } Ax = \sqrt{2} \sin\left(\frac{\theta}{2}\right) \quad \text{Formula 2}$$

$$\text{Amplitude ratio} = \left[\sqrt{2} \sin\left(\frac{\theta}{2}\right)\right]^k \cdot \sqrt{2} \cos\left(\frac{\theta}{2}\right) \quad \text{Formula 3}$$

Figure 3B:
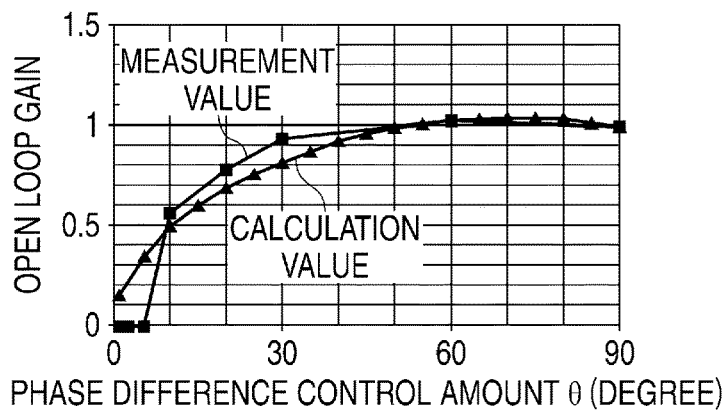
FIG. 3B is a graph showing an actual measurement result of an open loop gain of a response speed according to the phase difference control amount in comparison with a calculated value of the amplitude ratio of the conveyance vibration to the thrust-up vibration.
Figure 3C:
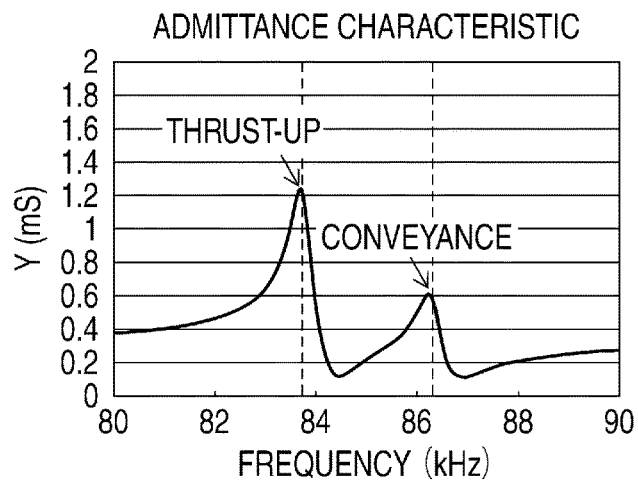
FIG. 3C is a graph showing a measurement result of an admittance characteristic of the vibration body.

FIG. 3B is a graph showing an actual measurement result of an open loop gain of the response speed according to the phase difference control amount θ in comparison with a calculated value of the amplitude ratio of the conveyance vibration to the thrust-up vibration. Moreover, FIG. 3C is a graph showing a measurement result of an admittance characteristic of the vibration body 15. The measurement value of the open loop gain is approximately coincident with the calculated value of the amplitude ratio of the conveyance vibration to the thrust-up vibration in a range where the phase difference control amount θ is more than 10 degrees. The calculated value of the amplitude ratio of the conveyance vibration to the thrust-up vibration is calculated under the condition where the admittance-ratio k is equal to 0.5 on the basis of the peak ratio of FIG. 3C.

The amplitude ratio of the conveyance vibration to the thrust-up vibration is lowered nonlinearly as the absolute value of the phase difference control amount θ decreases. In a range where the phase difference control amount θ is less than 10 degrees, the measurement value of the open loop gain of the response speed is also lowered in comparison with the calculated value. As a result, the responsiveness of the vibration-type actuator 10 at the time of a minute movement (a relative movement of the vibration body 15 and driven body 11 in a minute amount) is lowered. Accordingly, it is necessary to correct so that an absolute value of a phase difference operation amount increase as the absolute value of the phase difference control amount θ that defines the amplitude ratio of the conveyance vibration to the thrust-up vibration decreases.

Figure 4A:
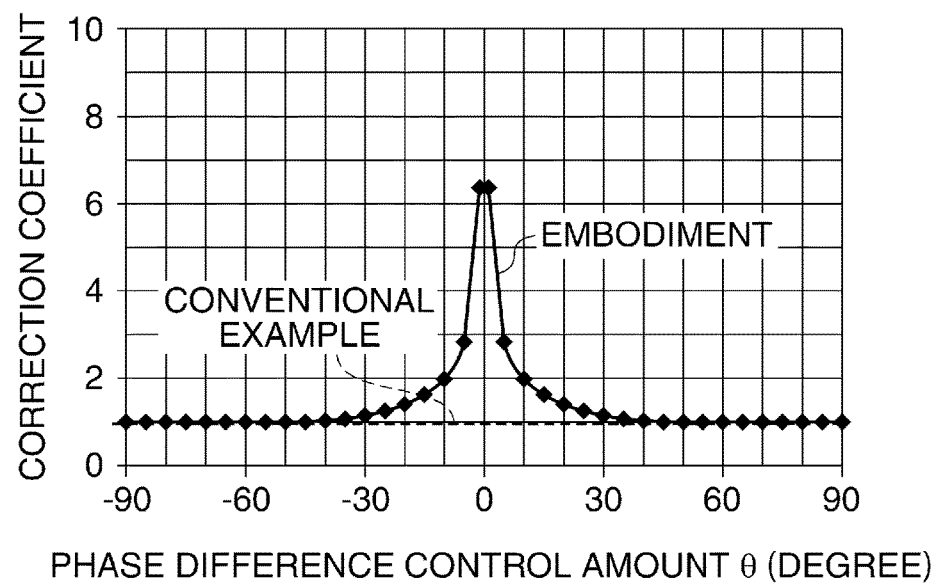
FIG. 4A is a graph showing a relation between a correction coefficient used by a control amount correction unit constituting a driving apparatus in FIG. 2 and the phase difference control amount comparison with a conventional example.

FIG. 4A is a graph showing a relation between a correction coefficient used by the control amount correction unit 105 and the phase difference control amount θ in comparison with a conventional example. In the conventional example indicated by a broken line, the correction coefficient to the phase difference control amount θ is always "1", and phase difference control amount θ is never corrected. Against this, in the embodiment indicated by a solid line, the control amount correction unit 105 multiplies a correction coefficient shown by the following formula 4 so that the phase difference correction amount becomes large in a range where the phase difference control amount θ is small. This correction coefficient corresponds to the reciprocal of the amplitude ratio of the conveyance vibration to the thrust-up vibration.

Figure 4B:
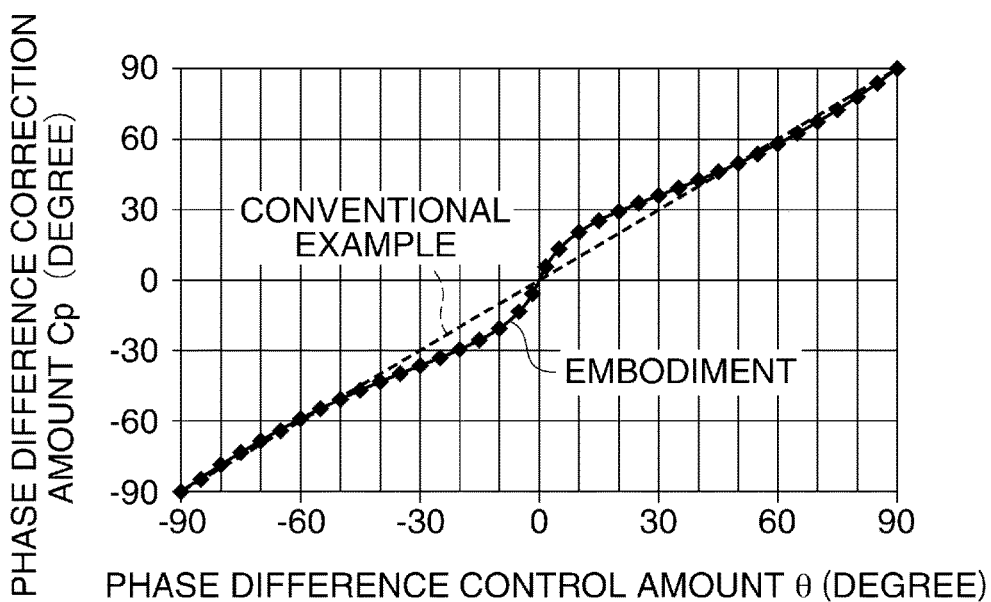
FIG. 4B is a graph showing a relation between a phase difference correction amount used by the control amount correction unit constituting the driving apparatus in FIG. 2 and the phase difference control amount in comparison with the conventional example.

FIG. 4B is a graph showing a relation between the phase difference control amount θ and the phase difference correction amount Cp in comparison with the conventional example. The phase difference correction amount Cp is obtained by multiplying the correction coefficient to the phase difference control amount θ, as shown by the following formula 5. The control amount correction unit 105 may find the phase difference correction amount Cp by calculation using the following formula 5, or may find using a look-up table etc. that is prepared in advance.

$$\text{Correction coefficient} = \frac{1}{\left[\sqrt{2} \sin\left(\frac{\theta}{2}\right)\right]^k \cdot \sqrt{2} \cos\left(\frac{\theta}{2}\right)} \quad \text{Formula 4}$$

$$\text{Correction amount: } Cp = \frac{\theta}{\left[\sqrt{2} \sin\left(\frac{\theta}{2}\right)\right]^k \cdot \sqrt{2} \cos\left(\frac{\theta}{2}\right)} \quad \text{Formula 5}$$

Figure 5A:
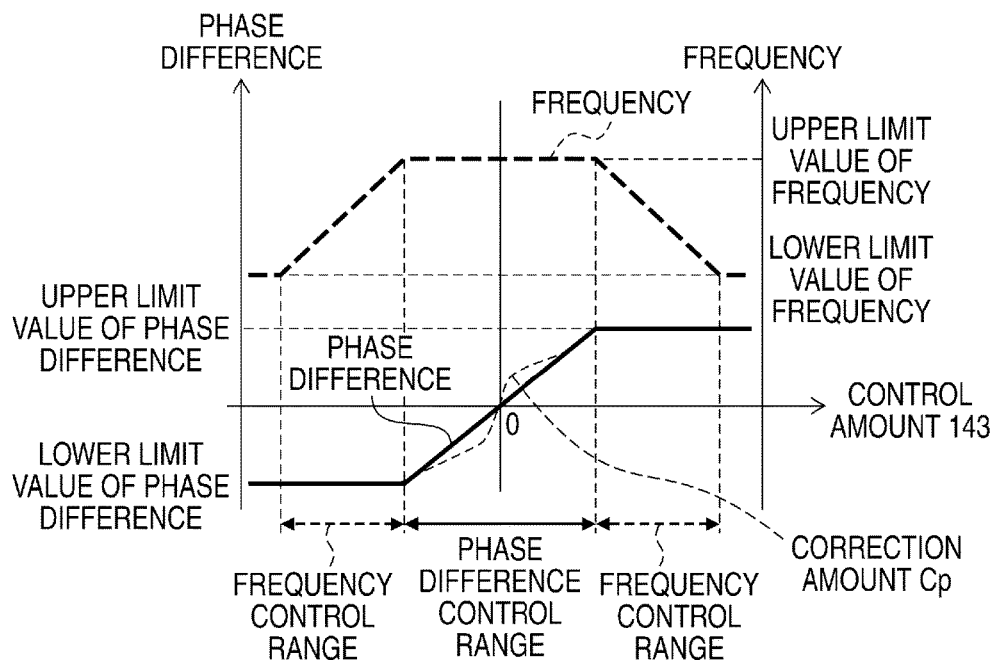
FIG. 5A is a graph showing a phase difference and frequency of a signal output from a phase-difference/frequency determination unit constituting the driving apparatus in FIG. 2 according to the control amount.

FIG. 5A is a graph showing a phase difference and frequency of a signal output from the phase-difference/frequency determination unit 106 according to the control amount 143. The phase-difference/frequency determination unit 106 changes the phase difference within a phase difference control range in which the absolute value of the control amount 143 is small. Moreover, the phase-difference/frequency determination unit 106 changes the frequency within frequency control ranges in which the absolute value of the control amount 143 is large. Thus, the phase-difference/frequency determination unit 106 switches the phase difference control and the frequency control according to the control amount 143.

In the phase difference control range, the frequency is fixed to the upper limit frequency, and the phase difference is changed in a range between the upper limit and lower limit of the phase difference (for example, from −90 degrees to +90 degrees) in order to control reversal of the driving direction, stop, and the driving speed in a low speed range of the driven body 11. At that time, the control amount correction unit 105 outputs the phase difference correction amount Cp so as to increase in a range where the absolute value of the control amount 143 is small as indicated by a broken line. On the other hand, in the frequency control ranges, the phase difference is fixed to the lower limit or upper limit of the phase difference, and the frequency is changed in a range between the upper limit and lower limit of the frequency (for example, from 89 kHz to 92 kHz) in order to control the driving speed of the driven body 11 in a high speed range.

Figure 5B:
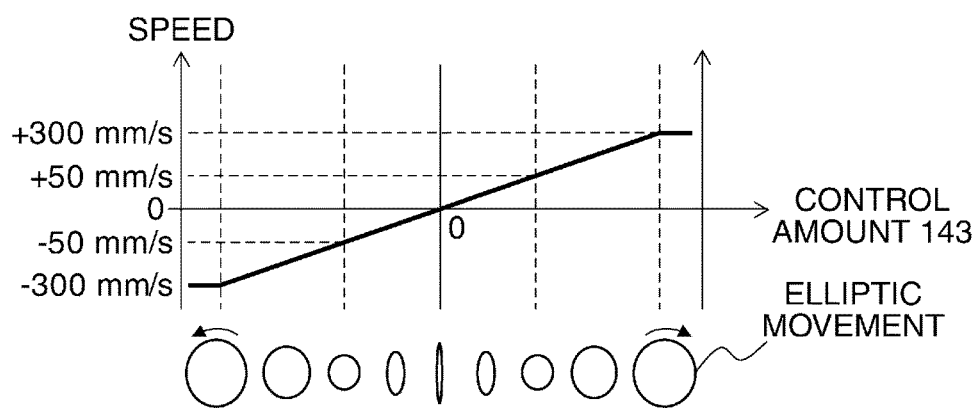
FIG. 5B is a graph showing a relation between the driving speed of the driven body and the control amount.

FIG. 5B is a graph showing the relation between the driving speed of the driven body 11 (a relative speed of the vibration body 15 and driven body 11) and the control amount 143. For example, the phase difference control is performed in the low speed range from −50 to +50 mm/s (s: second), and the frequency control is performed in the other high speed range. In the phase difference control, when the phase difference is controlled, the elliptical ratio of the elliptic movement that occurs in the projections 12 varies. When the sign of the phase difference is reversed, the direction of the elliptic movement is reversed. Then, when the control amount 143 is equal to zero (0), the elliptical ratio becomes zero (the ellipse shows a lengthwise shape), and the driving speed of the driven body 11 becomes zero.

On the other hand, in the frequency control, when the frequency is controlled, the amplitude of the vibration (the size of the elliptic movement) varies while keeping the elliptical ratio of the elliptic movement to be constant. The phase-difference/frequency determination unit 106 sets up the phase difference and frequency so that the driving speed of the driven body 11 varies linearly as much as possible according to the control amount 143.

Figure 6A:
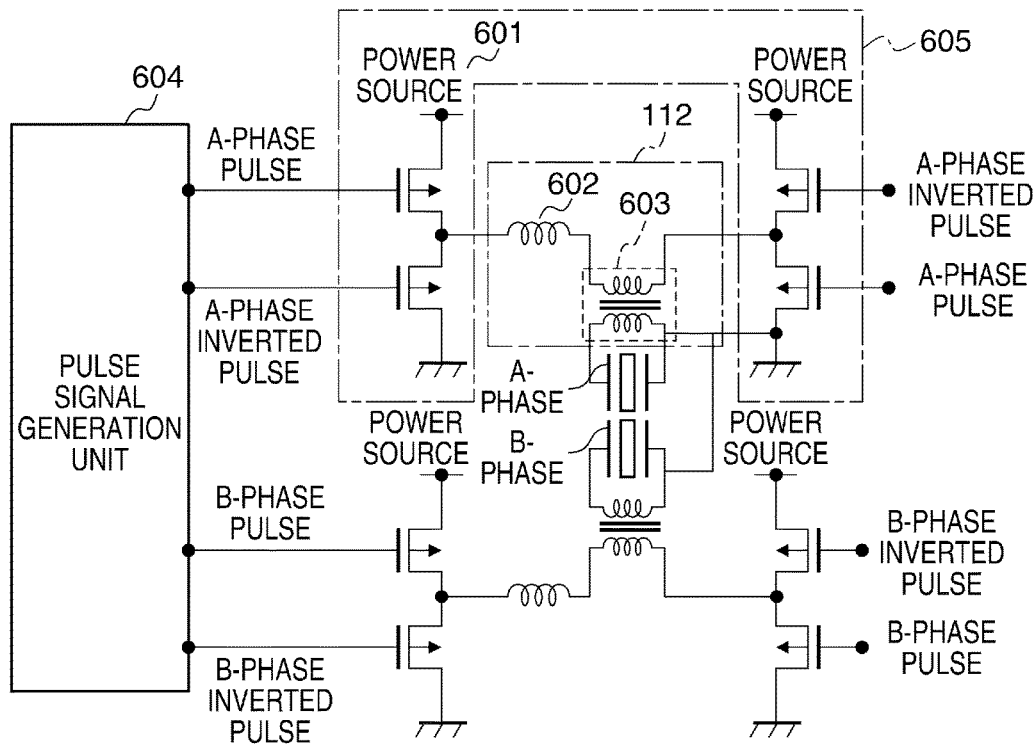
FIG. 6A is a block diagram schematically showing a configuration of a driving unit constituting the driving apparatus in FIG. 2.
Figure 6B:
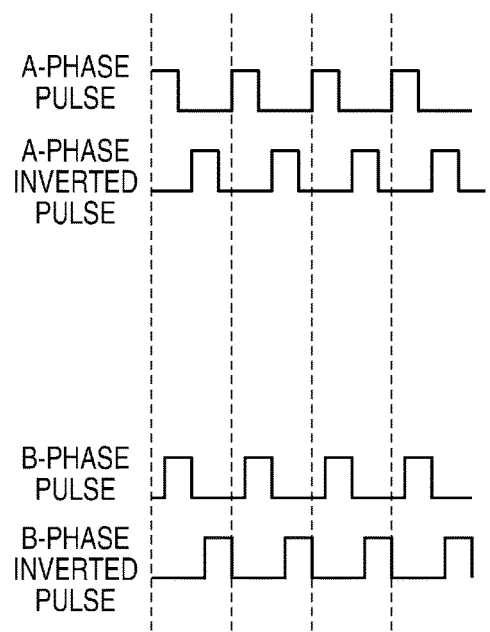
FIG. 6B is a view describing an alternating current signal output from an alternating current signal generation unit of the driving unit.

FIG. 6A is a block diagram schematically showing the configuration of the driving unit 110. FIG. 6B is a view describing the alternating current signal output from the alternating current signal generation unit 111 of the driving unit 110. The alternating current signal generation unit 111 has a pulse signal generation unit 604 and switching circuit 605, and generates alternating current pulse signals of two phases (A-phase and B-phase). The alternating current pulse signal of the A-phase corresponds to the alternating current signal before boosting to the alternating voltage VA applied to the piezoelectric device 14. The alternating current pulse signal of the B-phase corresponds to the alternating current signal before boosting to the alternating voltage VB applied to the piezoelectric device 14. Since the configuration of the portion that generates the alternating current pulse signal of the B-phase is the same as the configuration of the portion that generates the alternating current pulse signal of the A-phase, only the configuration of the portion that generates the alternating current pulse signal of the A-phase will be described, and a description for the side of the B-phase will be omitted in the following description.

The pulse signal generation unit 604 generates an A-phase pulse signal and A-phase inverted pulse signal that have phase difference information and frequency information on the basis of the phase difference and frequency control amount that were output from the phase-difference/frequency determination unit 106. Both the A-phase pulse signal and A-phase inverted pulse signal are input into the switching circuit 605. The switching circuit 605 has a power source 601, carries out switching operation of the direct current voltage supplied from the power 601 in the timing of an input pulse signal, and generates the alternating current signal of a square wave.

The booster circuit 112 has a coil 602 and transformer 603. The booster circuit 112 converts the alternating current signal of a square wave input from the switching circuit 605 into the alternating voltage VA of a sine wave that is boosted to the predetermined voltage, and applies it to the piezoelectric device 14. Similarly, the alternating voltage VB of the sine wave that is boosted to the predetermined voltage is applied to the piezoelectric device 14.

Figure 7A:
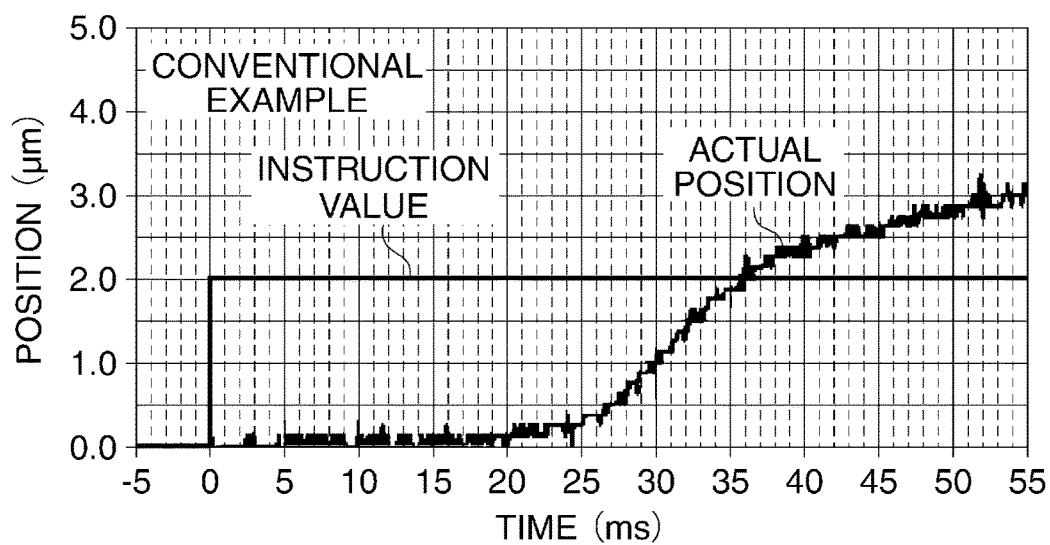
FIG. 7A is a graph showing a first control result of the vibration-type actuator with a conventional driving apparatus.
Figure 7B:
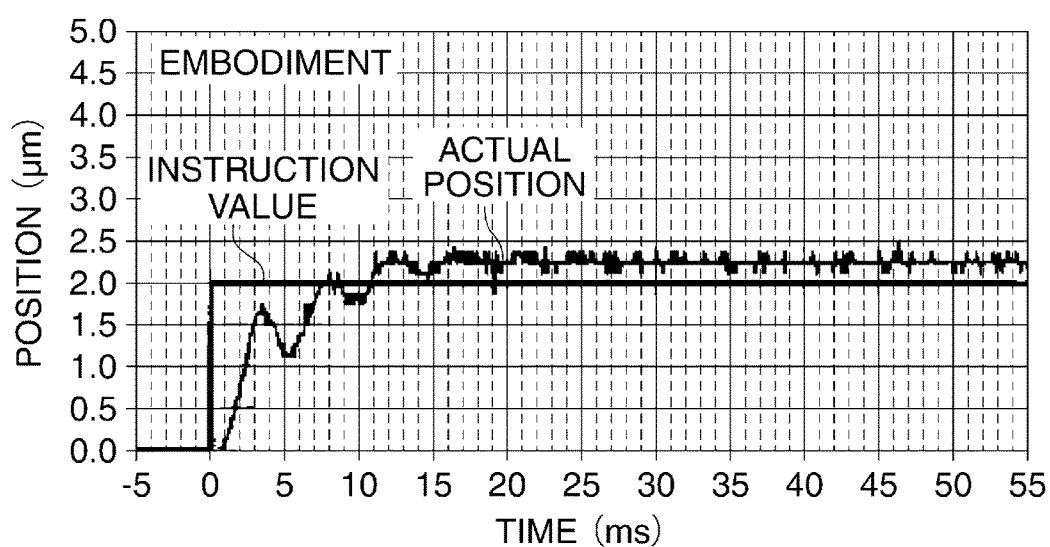
FIG. 7B is a graph showing a first control result of the vibration-type actuator with the driving apparatus in FIG. 2.

FIG. 7A is a graph showing a first control result of a vibration-type actuator with a conventional driving apparatus. FIG. 7B is a graph showing a first control result of the vibration-type actuator 10 with the driving apparatus 150 in FIG. 2. In these examples, the position feedback control is performed so as to follow a step signal (an instruction value) that moves the position of the driven body 11 by 2 micrometers against the vibration body 15. It should be noted that the conventional example is the control result by a control apparatus that does not have the control amount correction unit 105.

As shown in FIG. 7A, the conventional example takes 36 ms (mili second) until the actual position reaches the instruction value. Against this, as shown in FIG. 7B, the embodiment shortens the necessary time period to 8 ms. This shows that the driving control of the vibration-type actuator 10 by the driving apparatus 150 significantly improves the responsiveness to the minute movement as compared with the conventional example.

Figure 8A:
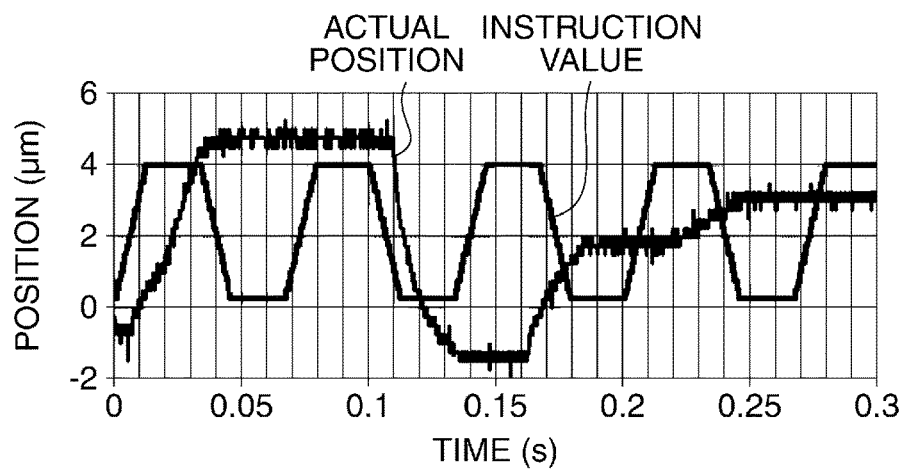
FIG. 8A is a graph showing a second control result of the vibration-type actuator with the conventional driving apparatus.
Figure 8B:
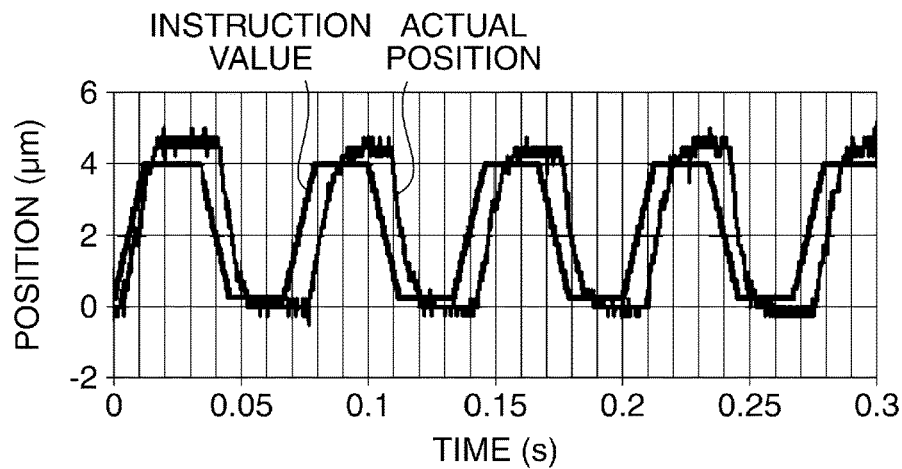
FIG. 8B is a graph showing a second control result of the vibration-type actuator with the driving apparatus in FIG. 2.

FIG. 8A is a graph showing a second control result of the vibration-type actuator with the conventional driving apparatus. FIG. 8B is a graph showing a second control result of the vibration-type actuator 10 with the driving apparatus 150 in FIG. 2. These examples show the results of the position feedback control that is performed according to a wobbling signal (instruction value) of a wobbling operation that reciprocates the driven body 11 by 4 micrometers against the vibration body 15. It should be noted that the conventional example is the control result by a control apparatus that does not have the control amount correction unit 105.

As shown in FIG. 8A, in the conventional example, the position of the driven body 11 cannot follow the instruction value. Moreover, even if the feedback control gain is raised simply in the conventional example, oscillation occurs and the actual position cannot follow the instruction value. Similarly, even if the voltage value of the alternating voltage applied to the piezoelectric device 14 is raised simply, the actual position cannot follow an instruction value. Against this, as shown in FIG. 8B, the embodiment significantly improves followability to the instruction value.

Figure 8C:
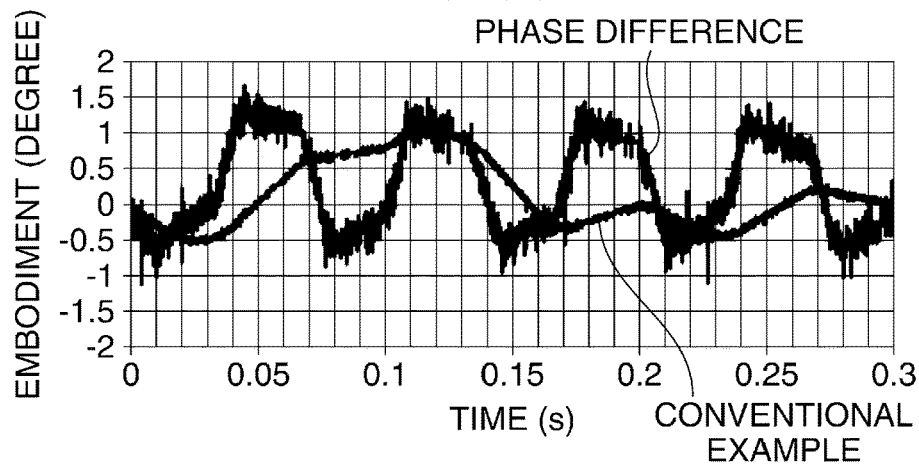
FIG. 8C is a graph showing a relation between a phase difference that is an operation parameter used for driving the vibration-type actuator and time in comparison with the conventional example.

FIG. 8C is a graph showing a relation between the phase difference that is an operation parameter used for driving the vibration-type actuator 10 and time in comparison with the conventional example. Since the control amount correction unit 105 corrects the operation amount in the range where the control amount is small, the change of the phase difference becomes sharp corresponding to the timing of starting motion. This shows that the driving control of the vibration-type actuator 10 by the driving apparatus 150 significantly improves the responsiveness to the wobbling operation in a minute distance as compared with the conventional example.

Figure 9A:
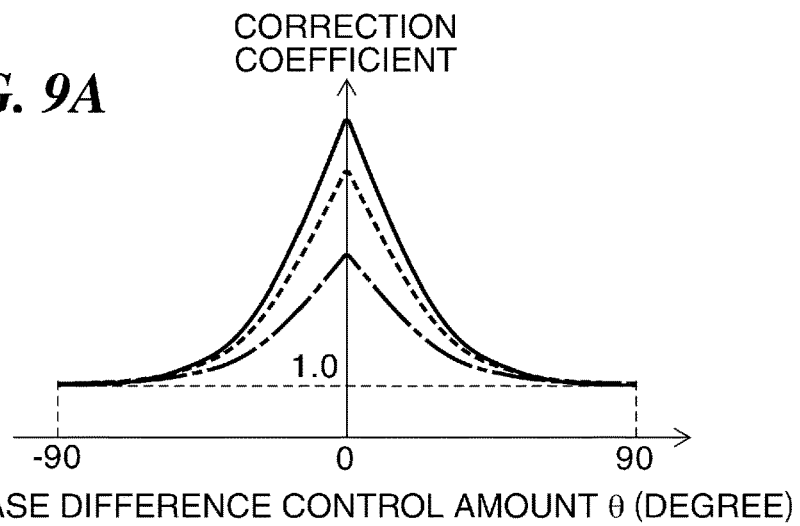
FIG. 9A, FIG. 9B, and FIG. 9C are views showing examples of the correction coefficient used by the control amount correction unit constituting the driving apparatus in FIG. 2.

FIG. 9A shows an example of a variation of the correction coefficients used by the control amount correction unit 105, and shows the example that changes the maximum of the correction coefficient. The correction coefficient is determined according to the phase difference control amount θ by using a look-up table or a formula.

The correction coefficient is equivalent to the feedback control gain. Moreover, when the phase difference control amount θ is equal to ±90 degrees, the correction coefficient is "1". This embodiment defines that a normal feedback control gain is "1". The responsiveness at the time of performing a minute movement improves as the maximum of a correction coefficient becomes large. However, the maximum of a correction coefficient is restricted to the value that does not cause a control oscillation.

Figure 9B:
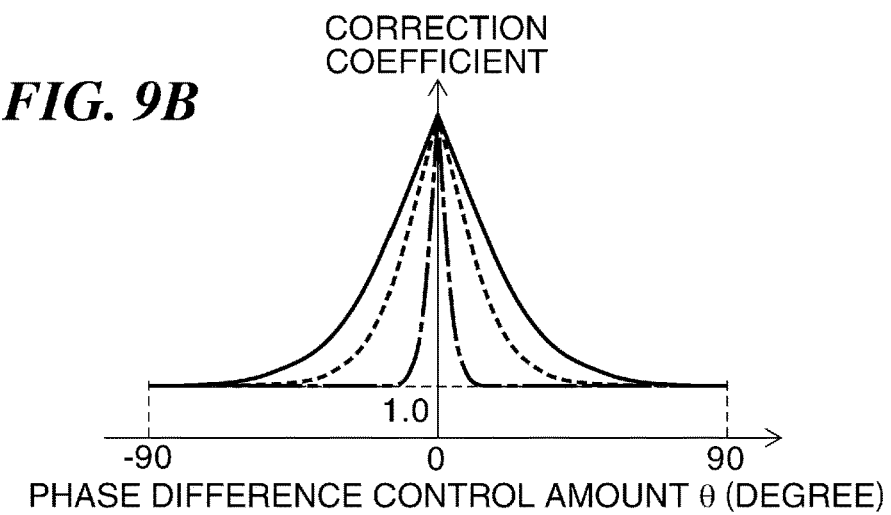

FIG. 9B shows an example of a variation of the correction coefficients used by the control amount correction unit 105, and shows the example that changes the rate of change of the correction coefficient on the basis of the phase difference control amount θ while keeping the maximum of the correction coefficient. The correction coefficient is determined according to the phase difference control amount θ by using a look-up table or a formula.

A range of the phase difference control amount θ where the correction coefficient becomes large for the pattern shown by a broken line or the pattern shown by an alternate long-and-short dash line is narrower than that for the pattern shown by a solid line. Since the admittance ratio of the conveyance vibration to the thrust-up vibration varies when the configuration of the vibration body 15 is changed, the relation between the amplitude ratio of the thrust-up vibration and conveyance vibration and the phase difference control amount θ also varies. Accordingly, since the responsiveness is lowered in the smaller phase difference control amount θ when the peak of the conveyance vibration of the vibration body 15 is small, for example, it is preferable to use the correction coefficient of the pattern shown by the alternate long-and-short dash line.

Figure 9C:
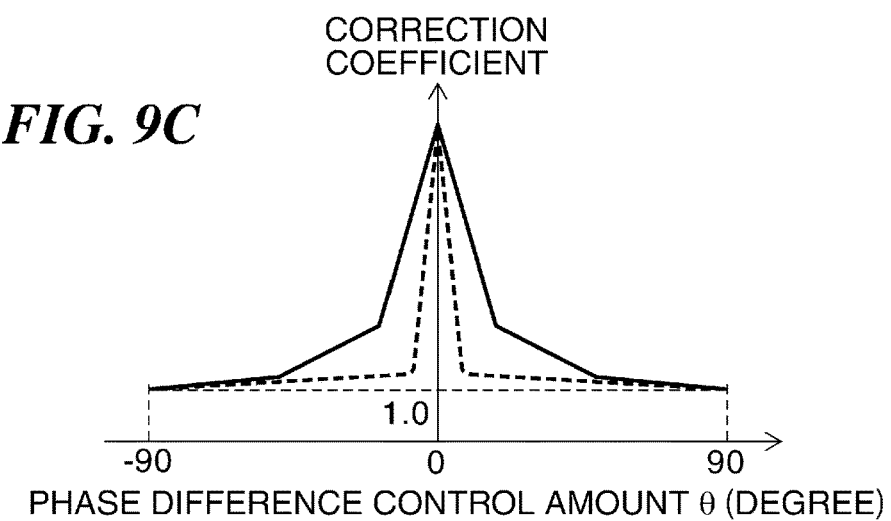

FIG. 9C is an example of a variation of the correction coefficients used by the control amount correction unit 105, and shows the example that divides the range of the phase difference control amount θ into a plurality of regions. The correction coefficient linearly changes in each of the regions. The example in FIG. 9C is equivalent to the modified example of the example shown in FIG. 9B. When the correction coefficient linearly changes in a predetermined region of the phase difference control amount θ, and when the relation between the correction coefficient and phase difference control amount θ is defined by using a look-up table or a formula, memory capacity is reduced or the calculation using a formula is simplified.

As described above, the driving apparatus 150 concerning this embodiment sets up the phase difference correction amount in the phase difference control range in which the absolute value of the phase difference control amount θ is small in consideration of the shape and amplitude of the vibration used for driving the vibration-type actuator 10 and the nonlinearity of the operation parameter. This improves the responsiveness of the vibration-type actuator 10 at the time of performing the minute movement.

Hereinafter, a second embodiment of the present invention will be described. A driving apparatus according to the second embodiment corrects a control amount of an operational parameter that defines vibration amplitudes of a conveyance vibration and thrust-up vibration on the basis of a phase difference control amount θ that defines an amplitude ratio of the conveyance vibration to the thrust-up vibration that are excited in a vibration body 15. It should be noted that the operational parameter that defines the vibration amplitudes is voltage or frequency of an alternating current signal.

Figure 10:
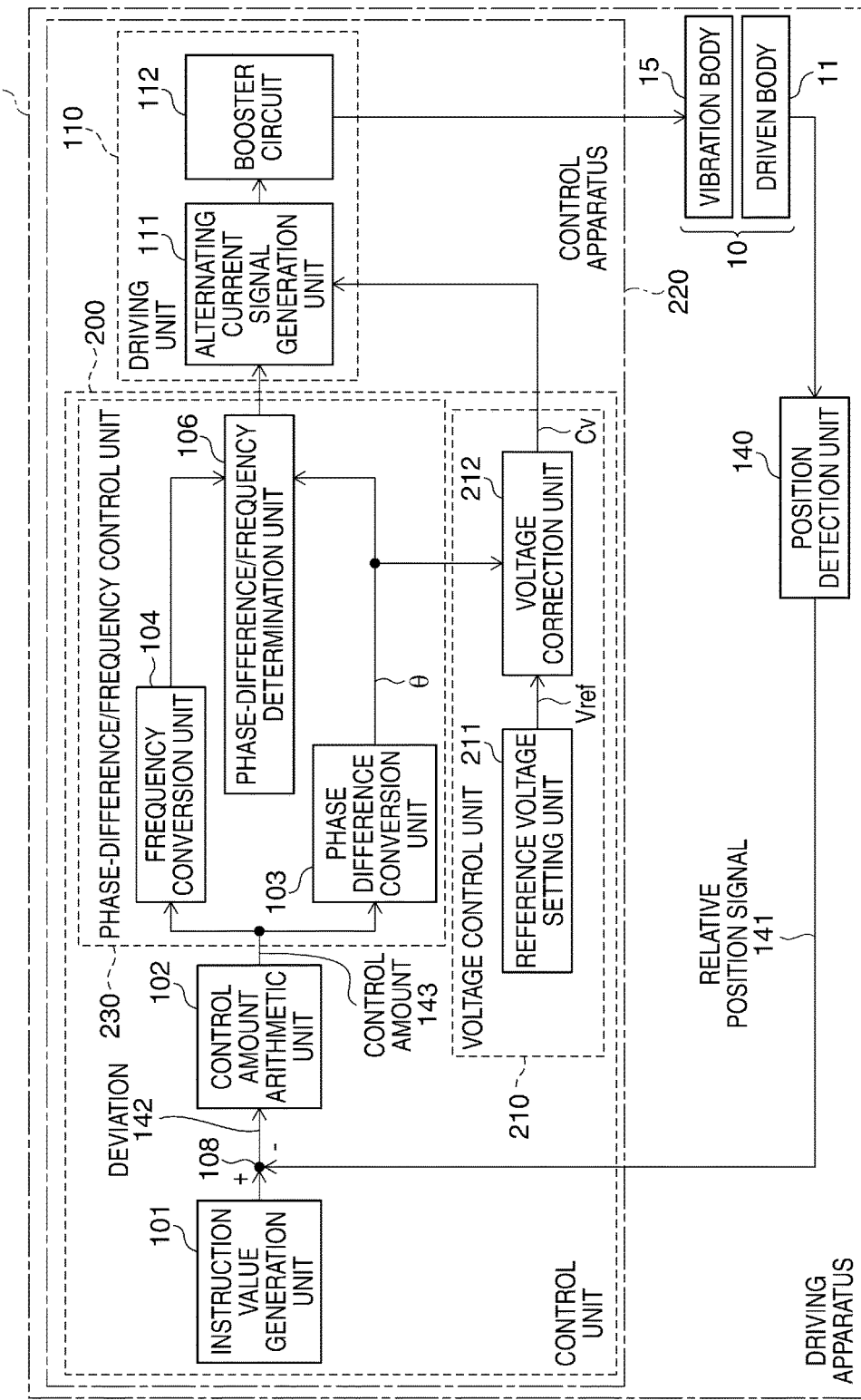
FIG. 10 is a block diagram schematically showing a configuration of a driving apparatus for the vibration-type actuator according to a second embodiment of the present invention.

FIG. 10 is a block diagram schematically showing a configuration of the driving apparatus 250 according to the second embodiment of the present invention. It should be noted that the same reference numerals are attached to components of the driving apparatus 250 that are identical to the components of the driving apparatus 150 described in the first embodiment, and their descriptions are omitted.

The driving apparatus 250 has the vibration-type actuator 10, a control apparatus 220, and the position detection unit 140. The control apparatus 220 has a control unit 200 and the driving unit 110. The control unit 200 has the instruction value generation unit 101, the control amount arithmetic unit 102, the subtractor 108, a phase-difference/frequency control unit 230, and a voltage control unit 210.

The phase-difference/frequency control unit 230 is different from the phase-difference/frequency control unit 130 shown in FIG. 2 in a point that the control amount correction unit 105 is not provided and a point that the phase difference control amount θ output from the phase difference conversion unit 103 is supplied to the voltage control unit 210. Moreover, the control unit 200 is different from the control unit 100 shown in FIG. 2 in a point that the voltage control unit 210 is provided in place of the voltage adjustment unit 107.

The voltage control unit 210 has a reference voltage setting unit 211 and a voltage correction unit 212, and outputs pulse width information for adjusting the voltage of the alternating current signal generated by the driving unit 110. The pulse width means a duty ratio of a rectangular pulse signal input into the driving unit 110. The voltage of the alternating current signal generated by the driving unit 110 increases as the pulse width increases.

The reference voltage setting unit 211 sets up the reference voltage value Vref. The voltage correction unit 212 calculates a pulse width correction factor Cv within a range from 10% to 50% on the basis of the phase difference control amount θ, and outputs it to the driving unit 110. The pulse width correction factor Cv is calculated by the following formula 6 with using a pulse width correction factor Fref corresponding to the reference voltage value Vref and the admittance ratio k. Accordingly, the alternating current signal generation unit 111 of the driving unit 110 corrects the voltage of the alternating current signal according to the pulse width correction factor Cv.

$$\text{Correction factor: } Cv = \frac{Fref}{\left[\sqrt{2}\sin\left(\frac{\theta}{2}\right)\right]^k \cdot \sqrt{2}\cos\left(\frac{\theta}{2}\right)} \quad \text{Formula 6}$$

The control apparatus 220 operates the vibration amplitudes of the conveyance vibration and thrust-up vibration by correcting the voltage of the alternating current signal on the basis of the amplitude ratio of the conveyance vibration to the thrust-up vibration. In this case, degradation of responsiveness when the amplitude ratio of the conveyance vibration to the thrust-up vibration is small is canceled by correcting the voltage by utilizing the fact that the vibration amplitude becomes large and responsiveness improves when voltage is enlarged.

In the following description, the position feedback control shall be performed according to a wobbling signal (instruction value) of a wobbling operation that reciprocates the driven body 11 by 4 micrometers against the vibration body 15.

Figure 11A:
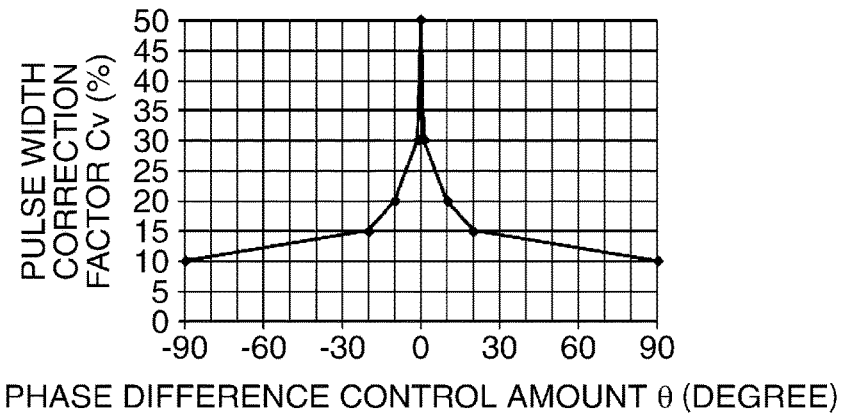
FIG. 11A is a graph showing a relation between a pulse width correction factor that is calculated by a voltage correction unit constituting the driving apparatus in FIG. 10 and a phase difference control amount.

FIG. 11A is a graph showing a relation between the pulse width correction factor Cv that is calculated by the voltage correction unit 212 and the phase difference control amount θ. The pulse width correction factor Cv in FIG. 11A is obtained by adjusting the value that is calculated with the formula 6 under a condition where the pulse width correction factor Fref corresponding to the reference voltage Vref is 10% and the admittance ratio k is 0.5 so as to vary linearly in each of a plurality of regions into which the range of the phase difference control amount θ is divided. It should be noted that a result shown in FIG. 11C is obtained when the vibration-type actuator 10 is actually controlled using a look-up table corresponding to the pulse width correction factor Cv in FIG. 11A. In this embodiment, the voltage of the alternating current signal is corrected by increasing the pulse width correction factor Cv in the range where the phase difference control amount θ is small.

Figure 11B:
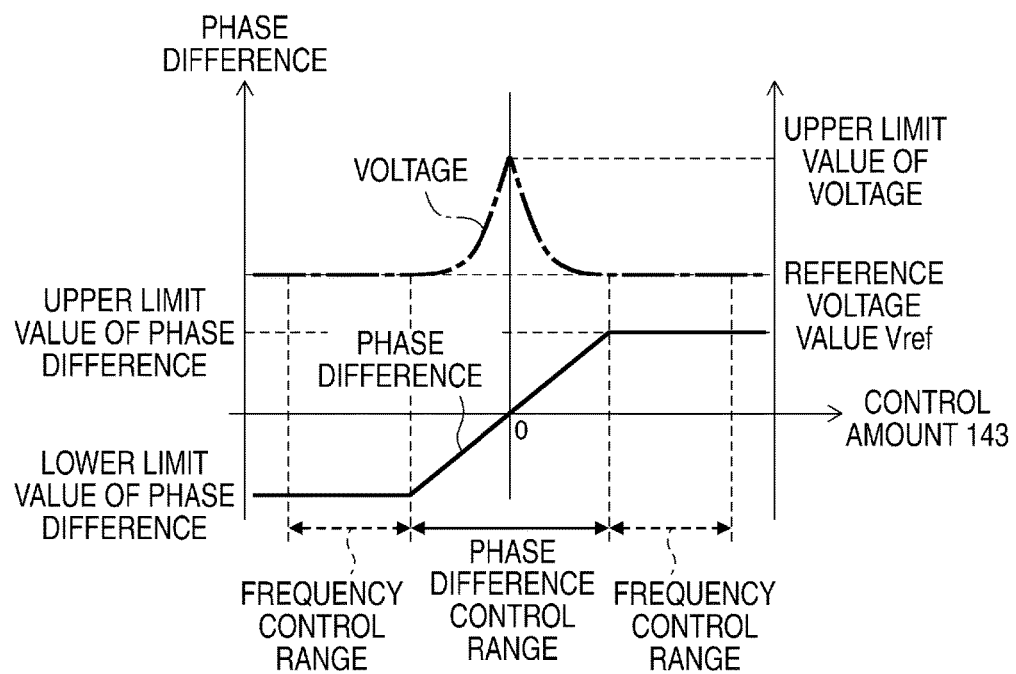
FIG. 11B is a graph showing the voltage output from a voltage control unit constituting the driving apparatus in FIG. 10 according to the control amount and phase difference.
Figure 11C:
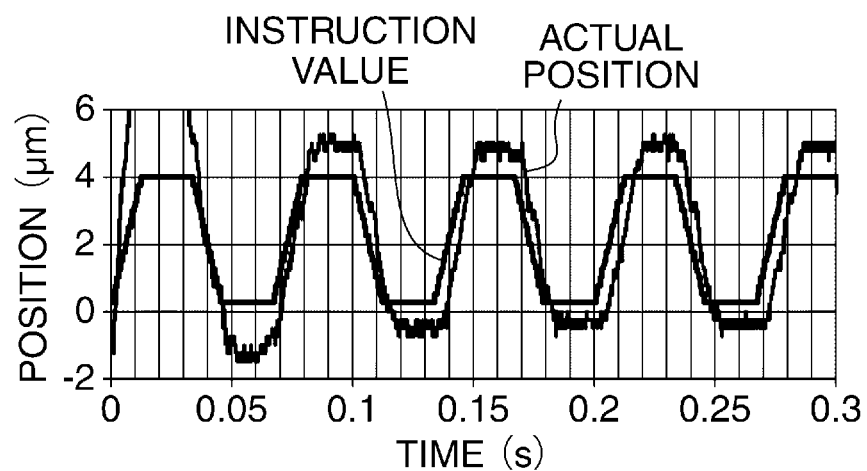
FIG. 11C is a graph showing a control result of a wobbling operation by the vibration-type actuator with the driving apparatus in FIG. 10.

FIG. 11B is a graph showing the correction amount Cv and phase difference output from the voltage control unit 210 according to the control amount. The voltage control unit 210 changes the phase difference and changes the pulse width correction factor Cv according to the phase difference using the formula 6 within a phase difference control range in which the absolute value of the control amount 143 is small. When the pulse width correction factor Cv becomes large, the voltage value of the alternating current signal becomes large. On the other hand, the voltage control unit 210 sets up frequency control ranges in which the absolute value of the control amount 143 is large. In the frequency control ranges, as shown in FIG. 11B, the voltage is fixed to the reference voltage value Vref and the frequency is changed, or the frequency is fixed and the voltage is changed.

Figure 11D:
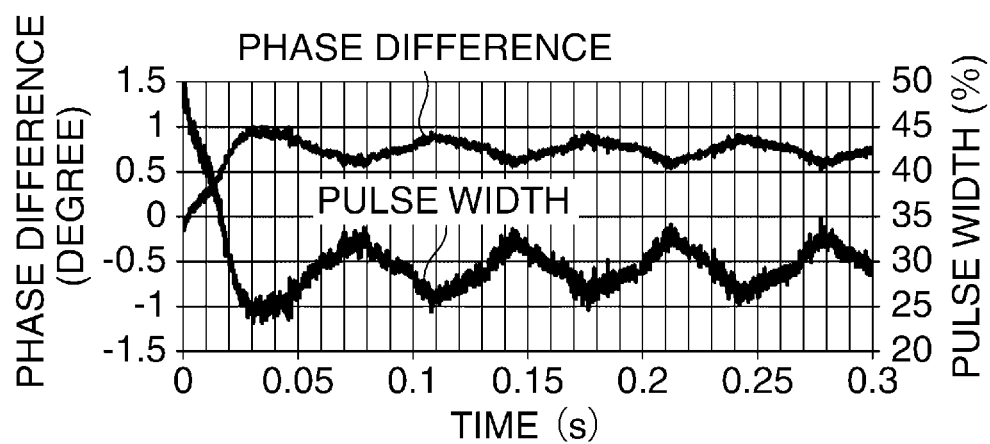
FIG. 11D is a graph plotting the phase difference and the correction factor of the pulse width under the wobbling operation.

FIG. 11C is a graph showing the control result to the wobbling operation. The driving apparatus 250 having the control apparatus 220 enables the operation that follows the instruction value. FIG. 11D is a graph plotting the phase difference and the pulse width correction factor Cv under the wobbling operation. It is understood that the voltage correction unit 212 corrects so that the pulse width becomes large in the range where the phase difference is small. Thus, when the driving apparatus 250 according to the second embodiment is used, the responsiveness in the minute movement of the vibration-type actuator 10 is significantly improved.

Next, a third embodiment of the present invention will be described. The driving apparatus according to the third embodiment improves the responsiveness in the minute movement of the vibration-type actuator 10 by correcting the frequency of the alternating current signal on the basis of the amplitude ratio of the conveyance vibration to the thrust-up vibration.

Figure 12:
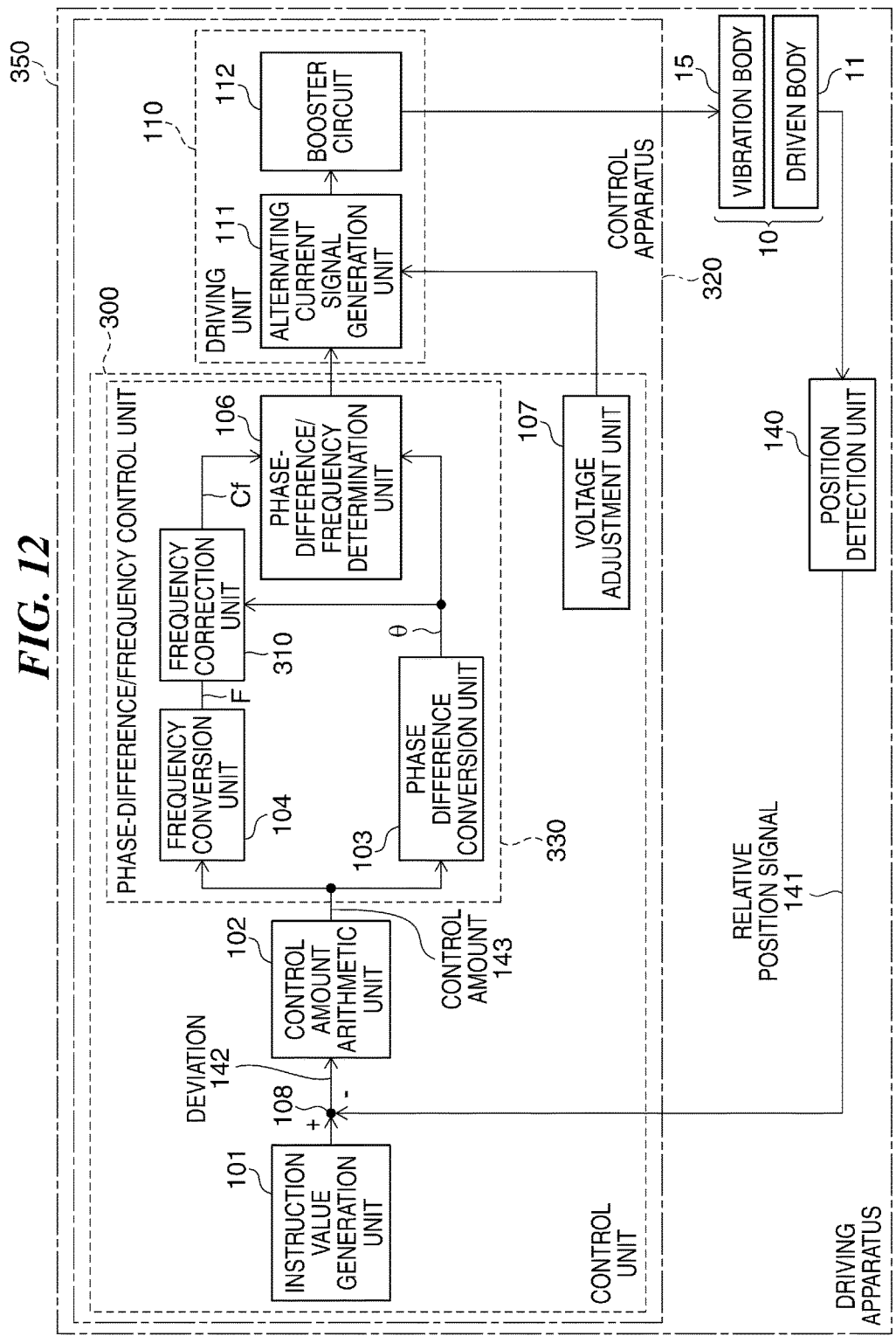
FIG. 12 is a block diagram schematically showing a configuration of a driving apparatus for the vibration-type actuator according to a third embodiment of the present invention.

FIG. 12 is a block diagram schematically showing a configuration of the driving apparatus 350 according to the third embodiment of the present invention. It should be noted that the same reference numerals are attached to components of the driving apparatus 350 that are identical to the components of the driving apparatus 150 described with reference to FIG. 2, and their descriptions are omitted.

The driving apparatus 350 has the vibration-type actuator 10, a control apparatus 320, and the position detection unit 140. The control apparatus 320 has a control unit 300 and the driving unit 110. The control unit 300 has the instruction value generation unit 101, the control amount arithmetic unit 102, the subtractor 108, a phase-difference/frequency control unit 330, and the voltage adjustment unit 107. The phase-difference/frequency control unit 330 is different from the phase-difference/frequency control unit 130 shown in FIG. 2 in the following points. That is, the phase-difference/frequency control unit 330 does not have the control amount correction unit 105, have a frequency correction unit 310, and supplies the phase difference control amount θ to the frequency correction unit 310 and phase-difference/frequency determination unit 106 from the phase difference conversion unit 103.

The frequency correction unit 310 determines a correction amount Cf that corrects a frequency control amount F output from the frequency conversion unit 104 on the basis of the phase difference control amount θ, and outputs it to the phase-difference/frequency determination unit 106. Accordingly, the frequency of the alternating current signal generated by the alternating current signal generation unit 111 is corrected on the basis of the amplitude ratio of the conveyance vibration to the thrust-up vibration, and the vibration amplitudes of the conveyance vibration and thrust-up vibration are operated. In this case, degradation of responsiveness when the amplitude ratio of the conveyance vibration to the thrust-up vibration is small is canceled by correcting the frequency of the alternating current signal by utilizing the fact that the vibration amplitude becomes large and responsiveness improves when a frequency operation amount becomes large. It should be noted that the frequency operation amount means a change amount of frequency when the frequency is swept from the high frequency range that is a standard for starting frequency etc. toward a low frequency range that includes a resonance frequency of the vibration body 15.

Figure 13A:
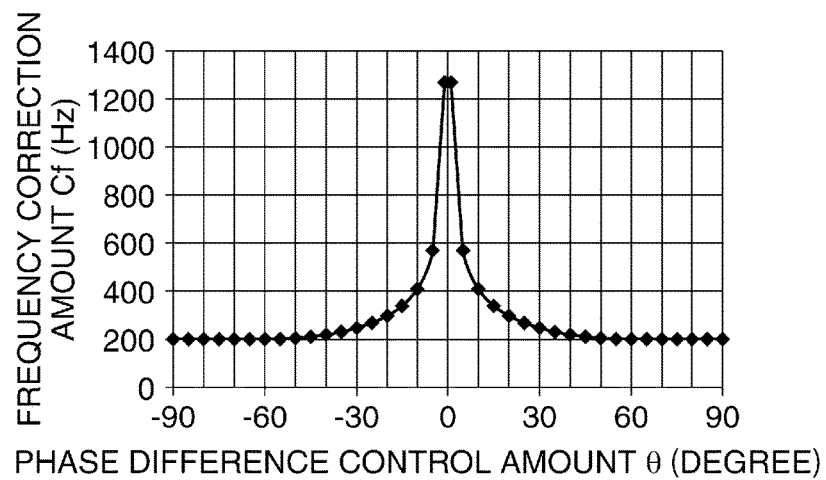
FIG. 13A is a graph showing a relation between a frequency correction amount used by a frequency correction unit constituting the driving apparatus in FIG. 12 and the phase difference control amount.

FIG. 13A is a graph showing a relation between the frequency correction amount Cf used by the frequency correction unit 310 and the phase difference control amount θ. The frequency correction amount Cf is set up so as to become large in a range where the absolute value of the phase difference control amount θ is small, and is calculated by the following formula 7 using the admittance ratio k. The frequency control amount F may be given as a fixed value, or may be a variable control amount given by the PID calculation of deviation. The correction amount Cf is calculated under a condition where the frequency control amount F is 200 Hz and the admittance ratio k is 0.5, for example.

$$\text{Correction amount: } Cf = \frac{F}{\left[\sqrt{2}\sin\left(\frac{\theta}{2}\right)\right]^k \cdot \sqrt{2}\cos\left(\frac{\theta}{2}\right)} \quad \text{Formula 7}$$

Figure 13B:
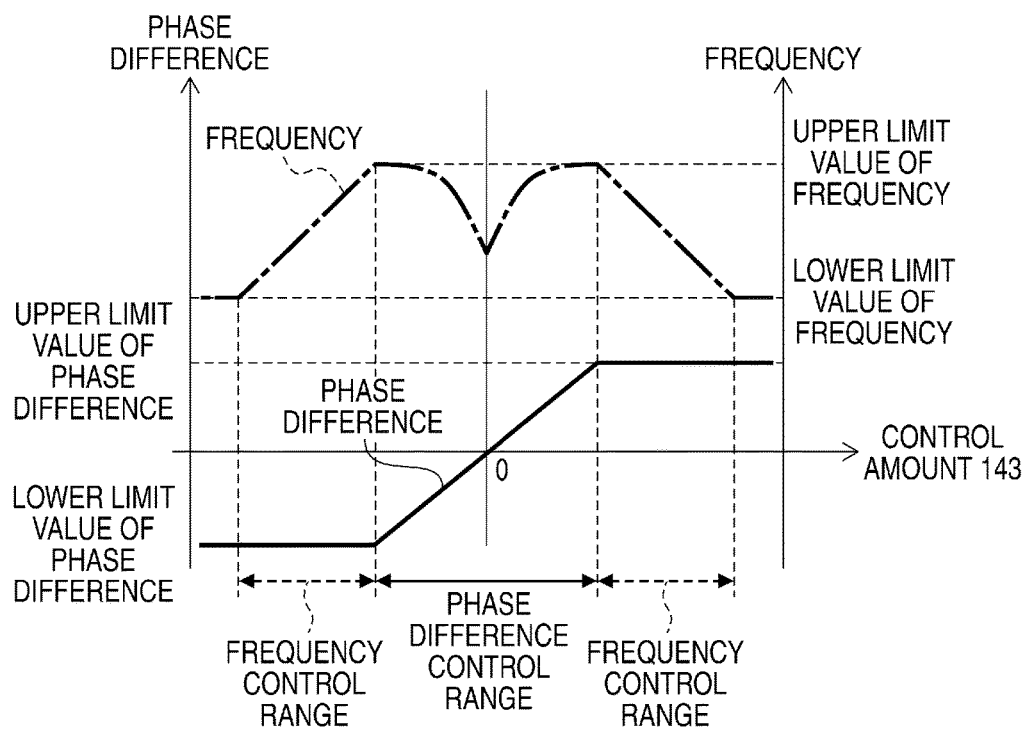
FIG. 13B is a graph showing the frequency and phase difference of a signal output from the frequency correction unit.

FIG. 13B is a graph showing the frequency and phase difference of the signal output from the frequency correction unit 310. The frequency shown in FIG. 13B shows a setting value output to the driving unit 110, and is obtained by subtracting the correction amount Cf from a standard frequency.

The frequency correction unit 310 controls the frequency correction amount Cf according to the phase difference using the formula 7 within a phase difference control range in which the absolute value of the control amount 143 is small. When the absolute value of the control amount 143 decreases, the frequency correction amount Cf increases, the frequency approaches the resonance frequency, and the vibration amplitude becomes large. The frequency correction unit 310 sets up frequency control ranges in which the absolute value of the control amount 143 is large. In the frequency control ranges, the frequency may be changed as shown in FIG. 13B, or the pulse width may be changed while fixing the frequency.

When the driving apparatus 350 according to the third embodiment is used, the responsiveness in the minute movement of the vibration-type actuator 10 is significantly improved as with the first embodiment.

Next, a fourth embodiment of the present invention will be described. In the fourth embodiment, a vibration-type actuator equipped with a piezoelectric device that has polarization regions different from the polarization regions shown in FIG. 1B, and its driving method will be described.

Figure 14A:
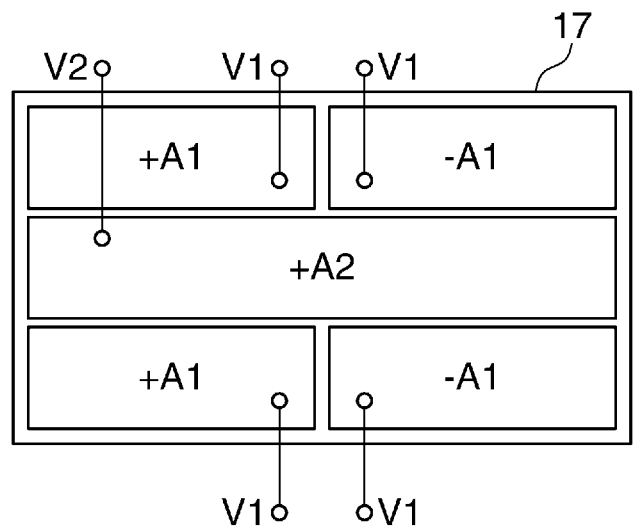
FIG. 14A is a plan view showing an electrode pattern and polarization regions formed on another piezoelectric device used in the vibration-type actuator.

FIG. 14A is a plan view showing an electrode pattern and polarization regions formed on the piezoelectric device 17 used in the vibration-type actuator. The piezoelectric device 17 has electrodes A1 and A2, and the electrode A1 has piezoelectric domains (+A1) that are polarized in plus (+) and the piezoelectric domains (−A1) that are polarized in minus (−). When an alternating voltage V2 is applied to the electrode A2, a primary bending vibration (the thrust-up vibration in the first vibration mode) shown in FIG. 1C occurs. Moreover, when an alternating voltage V1 is applied to the electrodes A1, a secondary bending vibration (the conveyance vibration in the second vibration mode) shown in FIG. 1D occurs.

When the alternating voltages V1 and V2 have the same frequency and their phases are shifted by 90 degrees, elliptic movements are caused in the projections 12, which relatively moves the driven body 11 and the vibration body 15 linearly. In that case, the amplitude of the thrust-up vibration is adjustable by controlling the voltage value of the alternating voltage V2 applied to the electrode A2. In the same manner, the amplitude of the conveyance vibration is adjustable by controlling the voltage value of the alternating voltage V1 applied to the electrodes A1.

Accordingly, when the amplitude ratio of the conveyance vibration to the thrust-up vibration is changed by changing the voltage ratio of the alternating voltages V1 and V2, the driving speed of the driven body 11 is controlled. It should be noted that each of the amplitudes of the thrust-up vibration and conveyance vibration may also be adjusted by adjusting the pulse widths of the alternating voltages V1 and V2 applied to the electrodes A1 and A2 using a digital circuit or logic circuit.

Figure 14B:
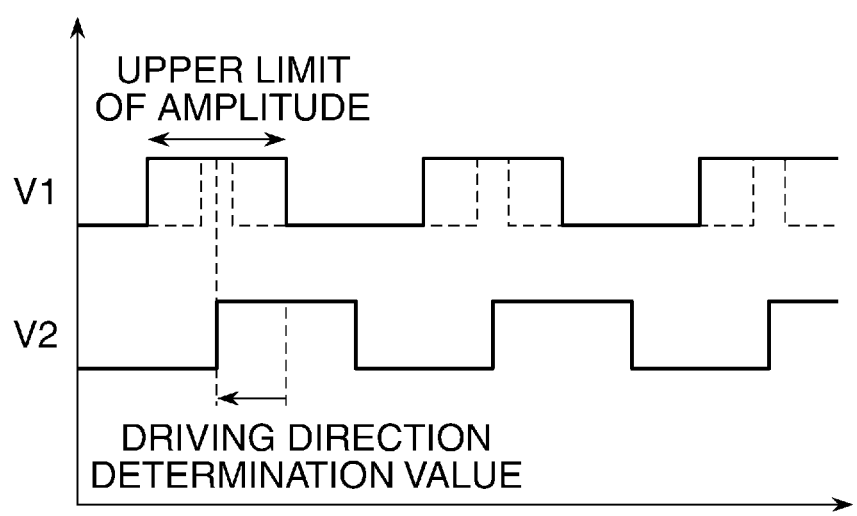
FIG. 14B is a view showing waveforms of alternating voltages applied to the electrodes of the piezoelectric device shown in FIG. 14A.

FIG. 14B is a view showing waveforms of alternating voltages V1 and V2 applied to the electrodes of the piezoelectric device 17. By changing the amplitude ratio of the conveyance vibration to the thrust-up vibration is adjusted by changing the pulse width of the alternating voltage V1 applied to the electrodes A1. For example, when the pulse width of the amplitude ratio upper limit is set to 50%, and the pulse width of the alternating voltage V1 is changed within a range from 10% to 50%, the voltage ratio of the alternating voltages V1 and V2 is changed. The driving speed of the driven body 11 decreases as the voltage ratio of the alternating voltage V1 to the alternating voltage V2 decreases, and the driving speed increases as the voltage ratio increases. At this time, a driving direction determination value of the alternating voltage V2 is set to +90 degrees or −90 degrees. The driving direction of the driven body 11 is switched by switching the driving direction determination value.

When the correction is applied to the vibration-type actuator equipped with the piezoelectric device 17 so that the control amount of the operational parameter that defines the amplitude ratio or the vibration amplitude becomes large when the amplitude ratio of the conveyance vibration to the thrust-up vibration is small, the responsiveness to the minute movement is improved. The operational parameter that defines the amplitude ratio is the voltage ratio (a first operational parameter) of the alternating voltages V1 and V2, and the operational parameter that defines the vibration amplitude is the voltage or frequency (a second operational parameter) of the alternating current signal.

When the control amount of the voltage ratio of the alternating voltages V1 and V2 is corrected, it is corrected so that the operation amount increases as the voltage ratio control amount Vr that defines the amplitude ratio of the conveyance vibration to the thrust-up vibration decreases. The voltage ratio correction amount Cvr is calculated by the following formula 9 using the admittance-ratio k by multiplying the correction coefficient shown by the following formula 8 to the voltage ratio control amount Vr so that the control amount becomes large in the range where the voltage ratio control amount Vr is small.

Moreover, when the frequency control amount of the alternating current signal is corrected, the frequency correction amount Cf is calculated by the following formula 10 using the admittance-ratio k by multiplying the correction coefficient shown by the following formula 8 to the frequency control amount F so that the control amount becomes large in the range where the voltage ratio control amount Vr is small. It should be noted that the voltage of the alternating current signal may be also corrected similarly.

Thus, even if the configuration of the piezoelectric device is different, the responsiveness when the amplitude ratio of the conveyance vibration to the thrust-up vibration is small is improved by correcting the voltage ratio of the alternating current signals, frequency, or voltage according to the amplitude ratio of the conveyance vibration to the thrust-up vibration.

$$\text{Correction coefficient} = \frac{1}{\left[\sqrt{2}\sin\left(\frac{Vr}{2}\right)\right]^k \cdot \sqrt{2}\cos\left(\frac{Vr}{2}\right)} \quad \text{Formula 8}$$

$$\text{Correction amount: } Cvr = \frac{Vr}{\left[\sqrt{2}\sin\left(\frac{Vr}{2}\right)\right]^k \cdot \sqrt{2}\cos\left(\frac{Vr}{2}\right)} \quad \text{Formula 9}$$

$$\text{Correction amount: } Cf = \frac{F}{\left[\sqrt{2}\sin\left(\frac{Vr}{2}\right)\right]^k \cdot \sqrt{2}\cos\left(\frac{Vr}{2}\right)} \quad \text{Formula 10}$$

Next, a fifth embodiment of the present invention will be described. In the fifth embodiment, an example that applies the driving apparatus 150, 250, or 350 mentioned above to an autofocus mechanism (referred to as an "AF mechanism") in an image pickup apparatus, such as a single-lens reflex camera, will be described. An AF mechanism needs to control positioning of a focusing lens in an optical axis direction with high accuracy at high speed, and accordingly position feedback control is performed using a position sensor, for example.

An AF mechanism accelerates a focusing lens from a stopped state to a predetermined speed, drives the focusing lens at a constant speed, slows down the focusing lens as it approaches a target position, and stops the focusing lens at the target position in general. At this time, the time required until the focusing lens approaches the target position should be as short as possible. The AF mechanism equipped with the vibration-type actuator 10 controls the driving speed of the driven body 11 corresponding to the driving speed of the focusing lens by adjusting the frequency, phase difference, pulse width of the alternating voltage applied to the piezoelectric device 14. Accordingly, when the driving frequency is close to the resonance frequency of the piezoelectric device 14, the vibration amplitude occurred in the vibration body 15 becomes large, which enables to drive the focusing lens at high speed, for example.

On the other hand, the driving of the focusing lens is controlled so as to operate in a minute distance quickly in a case of optical zooming or computer zooming. Moreover, some image pickup apparatus detects a focusing state by the wobbling operation that reciprocates a focusing lens by a minute distance. In such a minute movement of the focusing lens, there are problems of increase of settling time and deterioration of followability due to delay of a starting motion. These problems become more remarkable for a heavy lens and a high sensitivity lens.

The driving apparatuses 150, 250, and 350 mentioned above are extremely useful to such problems. That is, the driving apparatuses 150, 250, and 350 enable to improve the responsibility in a minute movement of the vibration-type actuator 10. Accordingly, the minute movement of the focusing lens is controllable with high accuracy by using the driving apparatus 150, 250, or 350 for the AF mechanism of the image pickup apparatus.

Figure 15:
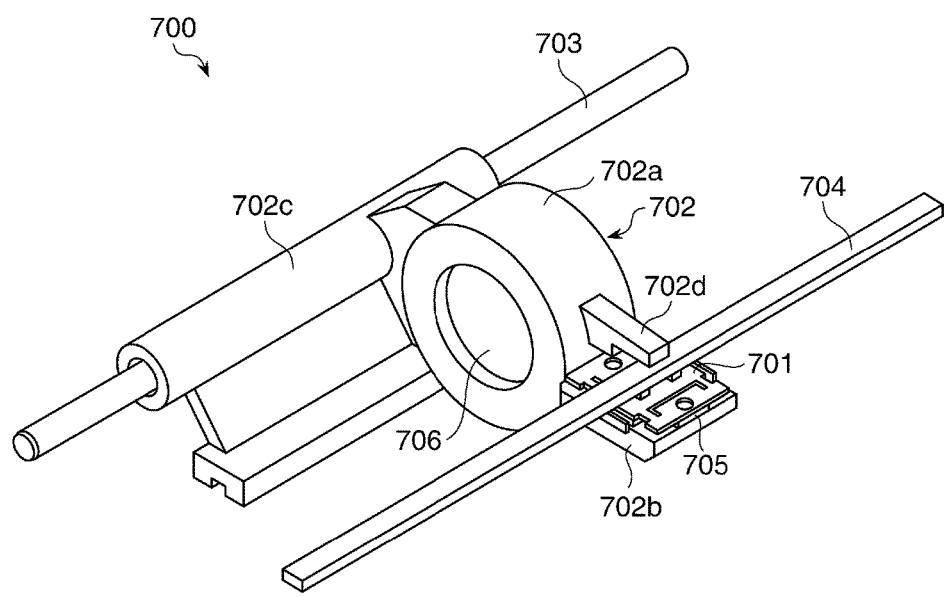
FIG. 15 is a perspective view schematically showing a configuration of a lens driving mechanism applying the vibration-type actuator in FIG. 1A.

FIG. 15 is a perspective view schematically showing a configuration of a lens driving mechanism 700 applying the vibration-type actuator 10. The lens driving mechanism 700 is provided with a vibration body 701, lens holding member 702, first guide bar 703, second guide bar 704, pressure magnet 705, and lens 706. The vibration body 701 is equivalent to the vibration body 15 shown in FIG. 1A, and the second guide bar 704 corresponds to the driven body 11 shown in FIG. 1A.

The first guide bar 703 and second guide bar 704 are held by a base (not shown) so as to be parallel mutually. The lens holding member 702 has a cylindrical holder 702a holding the lens 706, a holding portion 702b holding the vibration body 701 and pressure magnet 705, and a guide part 702c through which the first guide bar 703 is inserted. A first guide part is formed by inserting the first guide bar 703 through the guide part 702c movably.

When a magnetic circuit is formed between the pressure magnet 705 that is a permanent magnet and the second guide bar 704, and a magnetic attraction occurs between these members. The vibration body 701 arranged between the pressure magnet 705 and the second guide bar 704 is in pressure contact with the second guide bar 704. Accordingly, the two projections of the vibration body 701 (corresponding to the projections 12 of the vibration body 15 in FIG. 1A) are in pressure contact with the second guide bar 704, and a second guide part is formed.

Since the second guide part forms the guide mechanism using the magnetic attraction, the vibration body 701 may separate from the second guide bar 704 when receiving external force. As a countermeasure, the lens driving mechanism 700 is configured so that a falling preventive part 702d disposed on the lens holding member 702 contacts to the second guide bar 704 and returns the lens holding member 702 (the vibration body 701) to the predetermined position.

When the predetermined alternating voltage is applied to the vibration body 701, friction driving force occurs between the vibration body 701 and second guide bar 704 as described with reference to FIG. 1A through FIG. 1D, and the lens holding member 702 is driven by this friction driving force. Although this embodiment takes up the lens driving mechanism 700 in which the vibration body 701 moves together with the lens holding member 702 in the optical axis direction, the lens driving mechanism may be configured to move the lens holding member holding the lens as the driven body in the optical axis direction against the fixed vibration body.

Figure 16A:
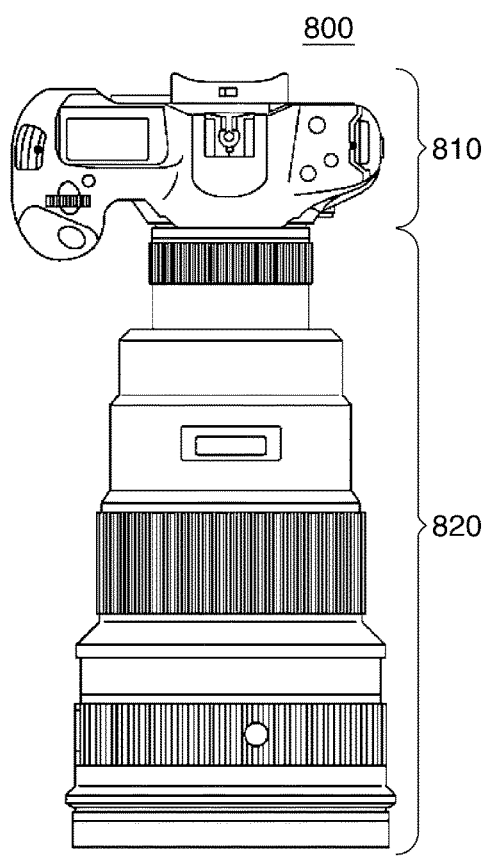
FIG. 16A is a plan view showing an external appearance of an image pickup apparatus equipped with an image stabilizing device applying the vibration-type actuator in FIG. 1A.
Figure 16B:
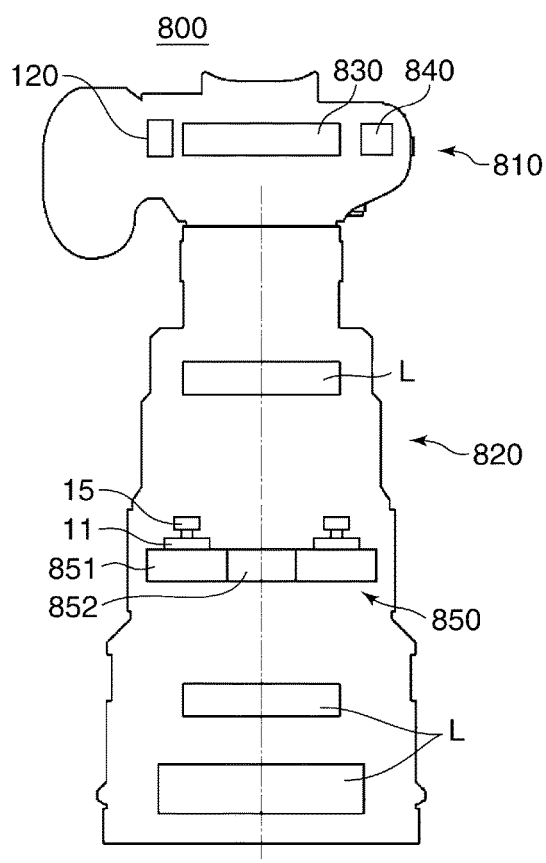
FIG. 16B is a view schematically showing an internal configuration of the image pickup apparatus shown in FIG. 16A.

Next, a sixth embodiment of the present invention will be described. In the sixth embodiment, an example that applies the driving apparatus 150, 250, or 350 mentioned above to an image stabilization mechanism in an image pickup apparatus, such as a single-lens reflex camera, will be described. FIG. 16A is a plan view (a top view) showing an external appearance of the image pickup apparatus 800. FIG. 16B is a view schematically showing an internal configuration of the image pickup apparatus 800.

The image pickup apparatus 800 consists of a body 810 and a lens barrel 820 that is detachable to the body 810. The body 810 is provided with an image pickup device 830, such as a CCD sensor and a CMOS sensor, which converts an optical image formed by light passing through the lens barrel into an image signal, and a camera control microcomputer 840 that controls the entire operations of the image pickup apparatus 800. Moreover, the body 810 has a control apparatus 120 that operates under control of the camera control microcomputer 840.

A plurality of lenses L, such as a focusing lens and a zooming lens, are arranged in the predetermined positions in the lens barrel 820. Moreover, an image stabilization device 850 is built in the lens barrel 820. The image stabilization device 850 has a disk member 851 and the driven body 11 attached to the disk member 851, and an image stabilization lens 852 is supported at a hole formed in the center of the disk member 851. The image stabilization device 850 is arranged so that the image stabilization lens 852 is movable in a plane that intersects perpendicularly with an optical axis of the lens barrel 820.

When the control apparatus 120 drives the vibration body 15, the driven body 11 and the disk member 851 relatively moves in the plane that intersects perpendicularly with the optical axis against the vibration body 15 that is fixed to the lens barrel 820, which drives the image stabilization lens 852. Although the image stabilization device that drives the correction lens 852 is described in this embodiment, an image stabilization device is not limited to this. An image stabilization device may drive the image pickup device 830 in a direction parallel to an image plane. Moreover, the image stabilization device may be configured that the vibration body 15 is fixed to the disk member 851 and the driven body 11 is fixed to the lens barrel 820. In such a configuration, the vibration body 15 and the disk member 851 moves in the plane that intersects perpendicularly with the optical axis to drive the image stabilization lens 852.

Figure 17:
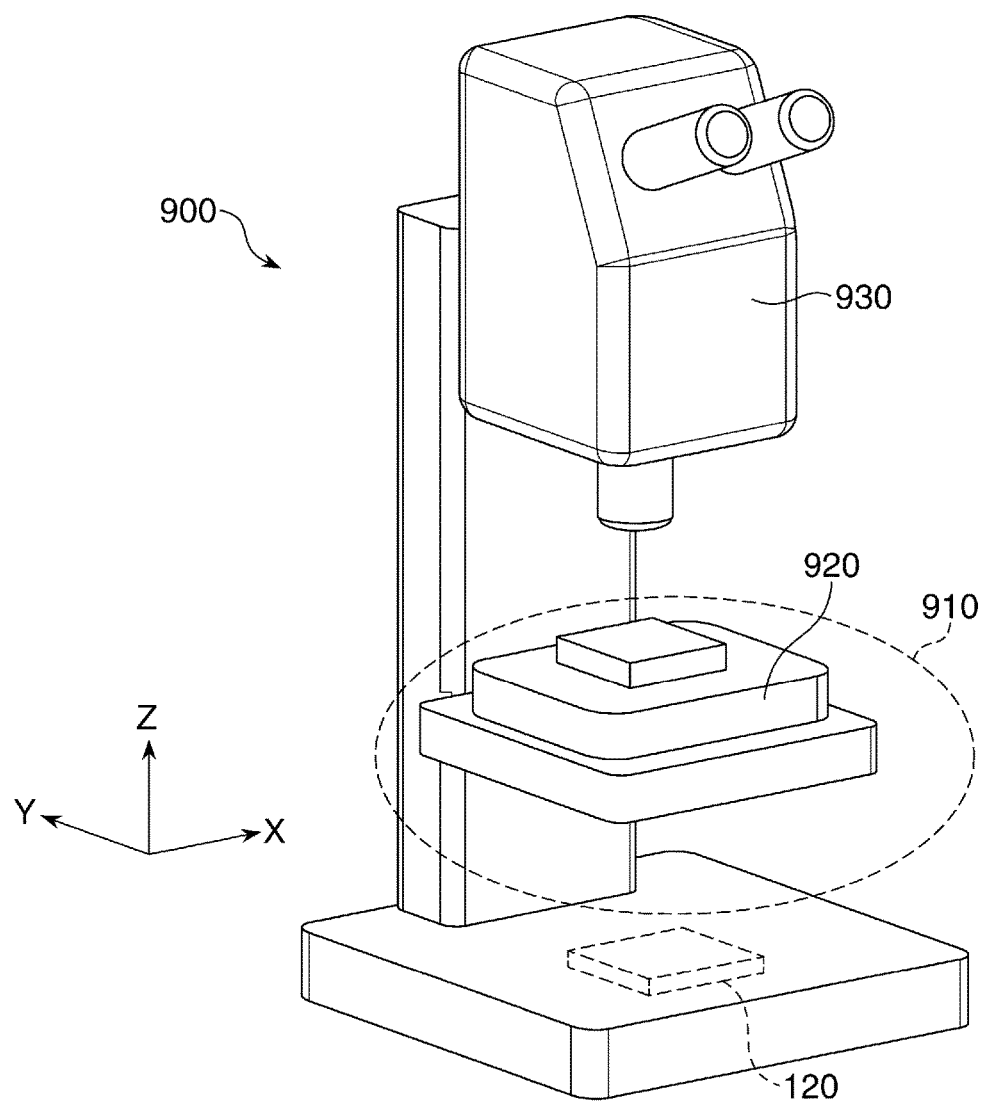
FIG. 17 is an external perspective view of a microscope that employs the driving apparatus in FIG. 2.
Figure 18A:
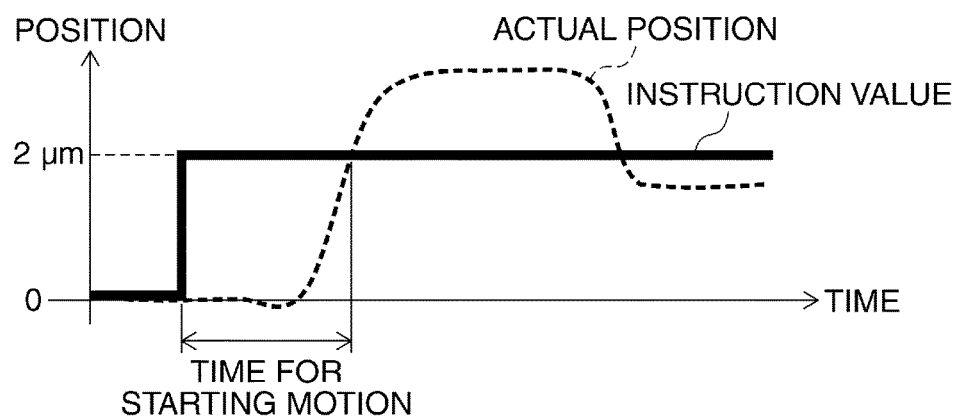
FIG. 18A is a view schematically showing an example of a driving profile in a case where a conventional driving apparatus performs a position feedback control to a minute movement of a vibration-type actuator.
Figure 18B:
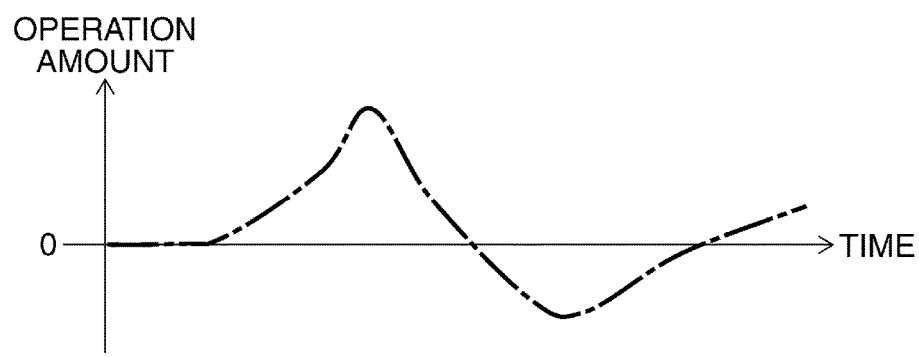
FIG. 18B is a view showing temporal changes of an operation amount for driving the vibration-type actuator with the conventional driving apparatus.

Next, a seventh embodiment of the present invention will be described. In the seventh embodiment, a configuration of a microscope having an X-Y stage as an example of an apparatus equipped with the driving apparatus 150 will be described. FIG. 17 is an external perspective view of the microscope 900 equipped with the driving apparatus 150. The microscope 900 is provided with an image pickup unit 930 and an automatic stage 910. The image pickup unit 930 includes an image pickup device and an optical system. The automatic stage 910 is an example of a stage apparatus having a stage 920 that is disposed on a base and is moved in an X-Y plane by the vibration-type actuator.

Although the control apparatus 120 constituting the driving apparatus 150 is arranged in a pedestal, the location of the control apparatus 120 is not limited to this. At least two actuators each of which is configured to hold the vibration body 15 by the base are employed as the vibration-type actuators 10. At least one vibration-type actuator is used for driving the stage 920 in an X-direction, and is arranged so that the X-direction of the vibration body 15 is coincident with the X-direction of the stage 920. At least one another vibration-type actuator is used for driving the stage 920 in a Y-direction, and is arranged so that the X-direction of the vibration body 15 is coincident with the Y-direction of the stage 920.

For example, an observation object is put on the upper surface of the stage 920, and an enlarged image is taken by the image pickup unit 930. When an observation area is wide, many taken images are obtained while moving the observation object by driving the automatic stage 910 to move the stage 920 in the X-direction or the Y-direction in the plane. When the taken images are combined by an image process with a computer (not shown), one image with the wide area and high definition is obtained. The applications of the vibration-type actuators concerning the embodiments are not limited to the apparatuses mentioned above. They are able to be widely applied to an electronic apparatus equipped with a component that needs positioning by driving.

The embodiments mentioned above show examples of the present invention, and it is possible to combine the embodiments suitably.

For example, the vibration-type actuator 10 shall be configured so that the vibration body 15 is fixed to a fixing means (not shown) and so that the driven body 11 moves against the vibration body 15, in the above-mentioned embodiments. However, the present invention is not limited to such a configuration. A configuration in which the driven body 11 is fixed to a fixing means and the vibration body 15 moves against the driven body 11 may be employed. Moreover, for example, the control apparatus 120 drives the piezoelectric device 14 constituting the vibration-type actuator 10 by dividing the piezoelectric device 14 into two phases. However, the present invention is not limited to such two phase driving, and is able to be applied to the vibration-type actuator that is driven with the alternating voltage more than two phase. Moreover, the voltage adjustment unit 107 may be provided with the control amount correction unit 105 in the driving apparatus 150.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-193427, filed Sep. 30, 2015, which is hereby incorporated by reference herein in its entirety.

What is claimed is:

1. A control apparatus for a vibration-type actuator comprising:
a vibration body having:
an electro-mechanical energy conversion element, and
an elastic body, and
a driven body that is in contact with the vibration body, the control apparatus comprising:
a driving unit configured to cause a thrust-up vibration in a pressing direction in which the vibration body is in contact with the driven body and a conveyance vibration in a direction that intersects with the pressing direction; and
a control unit 1) configured to feedback-control at least one of a relative position of the vibration body and the driven body and a driving speed by using a first operational parameter that defines an amplitude ratio of the conveyance vibration to the thrust-up vibration and a second operational parameter that defines an amplitude of the conveyance vibration and an amplitude of the thrust-up vibration, and 2) configured to output at least one of a feedback control gain of a control amount of the first operational parameter and a feedback control gain of a control amount of the second operational parameter so as to have a peak value of the feedback control gain in a case where a value of the first operational parameter is substantially zero.

2. The control apparatus for the vibration-type actuator according to claim 1, wherein said control unit uses phase difference of a plurality of alternating voltages applied to the electro-mechanical energy conversion element as the first operational parameter, and uses at least one of voltage and frequency of the plurality of alternating voltages as the second operational parameter.

3. The control apparatus for the vibration-type actuator according to claim 2, wherein a phase difference correction amount Cp is calculated by a formula 1 using a phase difference control amount θ and an admittance ratio k of the conveyance vibration to the thrust-up vibration:

$$Cp = \frac{\theta}{\left[\sqrt{2}\sin\left(\frac{\theta}{2}\right)\right]^k \cdot \sqrt{2}\cos\left(\frac{\theta}{2}\right)}. \qquad \text{Formula 1}$$

4. The control apparatus for the vibration-type actuator according to claim 2, wherein a voltage correction amount Cv is calculated by a formula 2 using a phase difference control amount θ, a pulse width correction factor Fref corresponding to a reference voltage value Vref, and an admittance ratio k of the conveyance vibration to the thrust-up vibration:

$$Cv = \frac{Vref}{\left[\sqrt{2}\sin\left(\frac{\theta}{2}\right)\right]^k \cdot \sqrt{2}\cos\left(\frac{\theta}{2}\right)}. \qquad \text{Formula 2}$$

5. The control apparatus for the vibration-type actuator according to claim 2, wherein a frequency correction amount Cf is calculated by a formula 3 using a phase difference control amount θ, a frequency control amount F, and an admittance ratio k of the conveyance vibration to the thrust-up vibration:

$$Cf = \frac{F}{\left[\sqrt{2}\sin\left(\frac{\theta}{2}\right)\right]^k \cdot \sqrt{2}\cos\left(\frac{\theta}{2}\right)}. \qquad \text{Formula 3}$$

6. The control apparatus for the vibration-type actuator according to claim 1, wherein said control unit uses a voltage ratio of a plurality of alternating voltages applied to the electro-mechanical energy conversion element as the first operational parameter, and uses at least one of frequency and voltage of the plurality of alternating voltages as the second operational parameter.

7. The control apparatus for the vibration-type actuator according to claim 6, wherein a voltage ratio correction amount Cvr is calculated by a formula 4 using a voltage ratio control amount Vr and an admittance ratio k of the conveyance vibration to the thrust-up vibration:

$$Cvr = \frac{Vr}{\left[\sqrt{2}\sin\left(\frac{Vr}{2}\right)\right]^k \cdot \sqrt{2}\cos\left(\frac{Vr}{2}\right)}. \qquad \text{Formula 4}$$

8. The control apparatus for the vibration-type actuator according to claim 6, wherein a frequency correction amount Cf is calculated by a formula 5 using a voltage ratio control amount Vr, a frequency control amount F, and an admittance ratio k of the conveyance vibration to the thrust-up vibration:

$$Cf = \frac{F}{\left[\sqrt{2}\sin\left(\frac{Vr}{2}\right)\right]^k \cdot \sqrt{2}\cos\left(\frac{Vr}{2}\right)}. \qquad \text{Formula 5}$$

9. The control apparatus for the vibration-type actuator according to claim 1, further comprising a position detection unit configured to detect a relative position of the vibration body and the driven body,
wherein said control unit feeds back the relative position detected by said position detection unit to a calculation of a control amount that is used to drive the vibration-type actuator.

10. A control method for a vibration-type actuator comprising:
a vibration body having:
an electro-mechanical energy conversion element, and
an elastic body, and
a driven body that is in contact with the vibration body, the control method comprising:
a driving step of causing a thrust-up vibration in a pressing direction in which the vibration body is in contact with the driven body and a conveyance vibration in a direction that intersects with the pressing direction;
a control step of feedback-controlling at least one of the relative position of the vibration body and the driven body and a driving speed in said driving step by a first operational parameter that defines an amplitude ratio of the conveyance vibration to the thrust-up vibration and a second operational parameter that defines an amplitude of the conveyance vibration and an amplitude of the thrust-up vibration; and
a correction step of outputting at least one of a feedback control gain of a control amount of the first operational parameter and a feedback control gain of a control amount of the second operational parameter so as to have a peak value of the feedback control gain in a case where a value of the first operational parameter is substantially zero.

11. A driving apparatus comprising:
a vibration-type actuator comprising:
a vibration body having:
an electro-mechanical energy conversion element, and
an elastic body, and
a driven body that is in contact with the vibration body; and
a control apparatus that controls the vibration-type actuator, the control apparatus comprising:
a driving unit configured to cause a thrust-up vibration in a pressing direction in which the vibration body is in contact with the driven body and a conveyance vibration in a direction that intersects with the pressing direction; and
a control unit 1) configured to feedback-control at least one of a relative position of the vibration body and the driven body and a driving speed by using a first operational parameter that defines an amplitude ratio of the conveyance vibration to the thrust-up vibration and a second operational parameter that defines an amplitude of the conveyance vibration and an amplitude of the thrust-up vibration, and 2) configured to output at least one of a feedback control gain of a control amount of the first operational parameter and a feedback control gain of a control amount of the second operational parameter so as to have a peak value of the feedback control gain in a case where a value of the first operational parameter is substantially zero.

12. An electronic apparatus comprising:
a member that is a target of positioning;
a moving mechanism that movably supports said member;
a vibration-type actuator comprising:
a vibration body having:
an electro-mechanical energy conversion element, and
an elastic body, and
a driven body that is in contact with the vibration body; and
a control apparatus that controls the vibration-type actuator, the control apparatus comprising:
a driving unit configured to cause a thrust-up vibration in a pressing direction in which the vibration body is in contact with the driven body and a conveyance vibration in a direction that intersects with the pressing direction; and
a control unit 1) configured to feedback-control at least one of a relative position of the vibration body and the driven body and a driving speed by using a first operational parameter that defines an amplitude ratio of the conveyance vibration to the thrust-up vibration and a second operational parameter that defines an amplitude of the conveyance vibration and an amplitude of the thrust-up vibration, and 2) configured to output at least one of a feedback control gain of a control amount of the first operational parameter and a feedback control gain of a control amount of the second operational parameter so as to have a peak value of the feedback control gain in a case where a value of the first operational parameter is substantially zero.

* * * * *